(12) United States Patent
Suda et al.

(10) Patent No.: US 7,575,652 B2
(45) Date of Patent: Aug. 18, 2009

(54) TIRE STRUCTURAL MEMBERS MANUFACTURING METHOD AND SYSTEM FOR CARRYING OUT THE SAME

(75) Inventors: Nobuyuki Suda, Kodaira (JP); Takashi Senbokuya, Kodaira (JP); Kenji Ogawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 359 days.

(21) Appl. No.: 11/143,638

(22) Filed: Jun. 3, 2005

(65) Prior Publication Data

US 2005/0224159 A1 Oct. 13, 2005

Related U.S. Application Data

(62) Division of application No. 10/220,642, filed on Sep. 4, 2002, now abandoned.

(51) Int. Cl.
*B29C 65/78* (2006.01)
*B29D 30/30* (2006.01)
*B29D 30/38* (2006.01)
(52) U.S. Cl. ............... 156/264; 156/133; 156/406.4
(58) Field of Classification Search .......... 156/117, 156/133, 134, 405.1, 406.4, 264, 265, 906, 156/907, 397
See application file for complete search history.

(56) References Cited

U.S. PATENT DOCUMENTS 2,473,067 A * 6/1949 Miller ................. 156/405.1

(Continued)

FOREIGN PATENT DOCUMENTS

DE 4134323 A 4/1993

(Continued)

OTHER PUBLICATIONS

Patent Abstracts of Japan re JP 09-029858, Feb. 4, 1997.

(Continued)

*Primary Examiner*—Geoffrey L Knable
(74) *Attorney, Agent, or Firm*—Sughrue Mion, PLLC

(57) ABSTRACT

A tire structural member manufacturing method forms a tire structural member from a narrow continuous strip by small, inexpensive equipment capable of being directly combined with a tire structural member forming machine, and a tire structural member manufacturing system carries out the tire structural member manufacturing method. The tire structural member manufacturing methods consists of a small number of steps and can be carried out by an efficient, simple, inexpensive tire structural member manufacturing system. The tire structural member manufacturing method forms a tire structural member by the steps of continuously forming a continuous strip of a width including that of a joint lap, cutting the continuous strip into successive cut strips of a length substantially equal to the section width of a tire, and successively laying and joining a predetermined number of the cut strips. The tire structural member manufacturing method forms a tire structural member also by the steps of continuously feeding a continuous strip to a strip-laying head, laying the continuous strip on a strip support while the strip-laying head is moved over the strip support for a forward stroke, cutting the continuous strip in a cut strip of a predetermined length when the strip-laying head reaches a position near the terminal of its forward stroke, changing the position of the strip-laying head by moving the strip-laying head and the strip support relative to each other, laying the continuous strip on the strip support while the strip-laying head is moved for a backward stroke, and repeating those steps overlap cut strips.

9 Claims, 21 Drawing Sheets

U.S. PATENT DOCUMENTS

| | | | |
|---|---|---|---|
| 3,826,297 A | 7/1974 | Alderfer | |
| 3,867,228 A * | 2/1975 | Brinkley et al. | 156/397 |
| 4,231,836 A | 11/1980 | Ljungqvist et al. | |
| 4,261,393 A | 4/1981 | Saito et al. | |
| 4,285,752 A | 8/1981 | Higgins | |
| 4,382,836 A | 5/1983 | Frank | |
| 4,707,212 A | 11/1987 | Hailey et al. | |
| 5,328,532 A | 7/1994 | Azuma et al. | |
| 5,911,846 A * | 6/1999 | Tatara et al. | 156/405.1 |
| 6,280,556 B1 | 8/2001 | Okada et al. | |

FOREIGN PATENT DOCUMENTS

| | | | |
|---|---|---|---|
| EP | 492918 A2 | 7/1992 | |
| EP | 537780 A | 4/1993 | |
| EP | 1048445 A2 | 11/2000 | |
| EP | 1145835 A2 | 10/2001 | |
| JP | 49-076978 A | 7/1974 | |
| JP | 54-015984 A | 2/1979 | |
| JP | 04-226742 A | 8/1992 | |
| JP | 05-309761 A | 11/1993 | |
| JP | 09-029858 A | 2/1997 | |

OTHER PUBLICATIONS

Patent Abstracts of Japan re JP 05-309761, Nov. 22, 1993.

* cited by examiner

UNIT : mm (1)

(2)

(1) TAPERED JOINT LAP (2) OBLIQUE JPOINT LAP (3) STEPPED JOINT LAPS

TIRE STRUCTURAL MEMBERS MANUFACTURING METHOD AND SYSTEM FOR CARRYING OUT THE SAME

This is a divisional application of Ser. No. 10/220,642 filed Sep. 4, 2002 now abandoned. The entire disclosure of the prior application is considered part of the disclosure of the accompanying divisional application and is hereby incorporated by reference.

TECHNICAL FIELD

The present invention relates to a tire structural member manufacturing method of manufacturing a tire structural member, such as inner liners, carcass plies and belts, and a tire structural member manufacturing system for carrying out the method.

BACKGROUND ART

FIG. 37 is a sectional view of a pneumatic tire 01. A carcass ply 03 having two axially opposite annular beads 02 bulges laterally. Circumferential belts 04 overlie the carcass ply 03, a rubber tread 05 circumferentially surrounds the belts 04, and the rubber tread 05 is coupled to the annular beads 02 by side walls 06. Thus, the pneumatic tire 01 has a substantially toroidal shape. An inner liner 07 is placed on the inner surface of the carcass ply 03 of the pneumatic tire 01. A length between the beads 02 along the inner surface of the inner liner 07 is designated as section width $W_s$. Thus, the inner liner 07 has a width substantially equal to the section width $W_s$.

Referring to FIG. 38, in a process of manufacturing the inner liner 07, an extruder 010 having a roller head 011 sends out a continuous strip 08 of a width W substantially equal to the section width $W_s$ continuously. The continuous strip 08 is cut into inner liner blanks 07 of a predetermined length P each for one tire. As shown in FIG. 38, the inner liner blank 07 is wound around a forming drum 012, the opposite end edges of the inner liner blank 07 are joined together, a carcass ply is wound around the inner liner blank 07, and an assembly of the inner layer blank 07 and the carcass play is subjected to a forming process. A calender may be used instead of the extruder 010 for forming the continuous strip 08. A continuous strip formed by a calender has a width W substantially equal to the section width $W_s$.

Since the continuous strip has the width W substantially equal to the section width $S_2$, the production of the continuous strip needs a large extruder or a calender, and a large plant. The extruder or the calendar has a production capacity far greater than that of the forming machine. Therefore, if the large extruder having a high production capacity is combined directly with the forming machine provided with a forming drum to form a production line, the production line is unable to operate at a high line speed, i.e., a production speed, due to the difference in production capacity between the extruder or the calender, and the forming machine and, consequently, the temperature of the continuous strip of rubber drops and the quality of the surface of the continuous strip is deteriorated.

Actually, a continuous strip formed by the extruder or the like is wound in rolls, and the rolls are stored. When the roll is used for forming an inner liner, the continuous strip is unwound from the roll and cut into cut strips, and the cut strips are fed one by one to the forming machine. Thus, spaces are necessary for storing and transporting the rolls of the continuous strip, the scale of the plant increases accordingly, and the equipment cost of the plant is high.

Conventional methods of forming carcass plies and belts include the following processes. A continuous strip formed by coating a plurality of cords with rubber is wound in a large roll. The continuous strip is unwound from the large roll, the continuous strip is extended on a conveyor with its leading edge placed at a predetermined position on the conveyor, the continuous strip is cut in a cut strip of a predetermined length by a ply cutting machine, the cut strip is turned through an angle of 90°, the conveyor is driven to move the cut strip by a predetermined distance, and a side edge part of the cut strip is joined to a side edge part of the preceding cut strip. These processes are repeated to form a continuous carcass ply continuous strip or a belt continuous strip, and the carcass ply continuous strip or the belt continuous strip is wound in rolls. The carcass ply continuous strip or the belt continuous strip unwound from the roll is cut into cut strips of a predetermined length corresponding to the size of a tire, and the cut strips obtained by cutting the carcass ply continuous strip or the belt continuous strip are processed by forming machines to form carcass plies or belts. The conventional methods need those machines and many processes, require inefficient work, and need a large-scale apparatus, a large floor space and a large plant and equipment investment.

DISCLOSURE OF THE INVENTION

The present invention has been made in view of the foregoing circumstances and it is therefore an object of the present invention to provide a tire structural member manufacturing method of manufacturing a tire structural member, using a small-scale, inexpensive system for processing a narrow continuous strip to form inner liners, and to provide a tire structural member manufacturing system capable of being directly connected to a forming machine.

Another object of the present invention is to provide a tire structural member manufacturing method of manufacturing a tire structural member, including a small number of steps and using an efficient, simple system, and to provide an inexpensive system for carrying out the method.

According to a first aspect of the present invention, a tire structural member manufacturing method includes the steps of: continuously forming a continuous strip of a width including that of a joint lap, cutting the continuous strip into successive cut strips of a length substantially equal to the section width of a tire, and successively laying and joining a predetermined number of the cut strips to form a tire structural member.

An extruder or the like needs to produce the narrow continuous strip. Therefore, the extruder may be small, requires only a small floor space for installation, is capable of easily directly connected to a forming machine because its production ability matches that of the forming machine, and reduces the scale and cost of equipment.

In the tire structural member manufacturing method according to the present invention, the continuous strip is formed in a width equal to the sum of a width equal to an integral division of the circumference of a 1 in. diameter circle and the width of a joint lap to form an inner liner.

The design diameter of the rim of a wheel is expressed in inch, such as 13 in., 14 in. and 15 in., and the inner liner has a circumference corresponding to the circumference of the rim. Therefore, the inner liner having a proper length can be easily formed simply by successively overlapping and joining the cut strips having the width equal to the sum of a width equal to an integral division of the circumference of a 1 in. diameter circle and the width of a joint lap.

The circumference of a 1 in. diameter circle is 25.4π=79.8 mm. Therefore, the cut strips are formed in a width equal to the sum of an integral division of 79.8 mm, namely, 79.8 mm, 39.9 mm, 26.6 mm or such, and the width of the joint lap, and the inner liner can be formed by successively overlapping and joining the cut strips.

In the tire structural member manufacturing method according to the present invention, an inner liner is formed by a step of forming the continuous strip in a width equal to the sum of a width equal to an integral division of the circumference of a 1 in. diameter circle and the width of a joint lap; a step of feeding a predetermined length of the continuous strip on a conveyor in a direction perpendicular to the conveying direction of the conveyor; a step of cutting the continuous strip in a cut strip of a predetermined length substantially equal to the section width of the tire along a line parallel to the conveying direction; a step of advancing the cut strip by operating the conveyor; a step of feeding the continuous strip such that a side edge part thereof overlies a side edge part of the preceding cut strip; and repeating the foregoing steps.

Thus, an inner liner of a width equal to the section width and a length equal to the circumference of the rim can be efficiently manufactured by laying the continuous strip having a width equal to the sum of a width equal to an integral division of the circumference of a 1 in. diameter circle and the width of a joint lap on a conveyor, cutting the continuous strip in the predetermined length substantially equal to the section width, advancing the cut strip, feeding the continuous strip such that a side edge part thereof overlies a side edge part of the preceding cut strip, and repeating the foregoing steps to successively overlapping and joining a necessary number of the cut strips.

In the tire structural member manufacturing method according to the present invention, the continuous strip is fed continuously to a strip-laying head, the strip-laying head lays the continuous strip on a strip support as the same is moved transversely for a forward stroke over the strip support, the continuous strip is cut in a cut strip of a predetermined length when the strip-laying head reaches a position near the terminal of its forward stroke, the strip-laying head and the strip support are moved relative to each other to change the position of the strip-laying head, the strip-laying head lays the continuous strip on the strip support so that the continuous strip is boned to the preceding cut strip as the same is moved transversely for a backward stroke over the strip support, and those steps are repeated to overlap cut strips.

Since the strip-laying head moves for a forward stroke laying the continuous strip on a strip support and joining the same to the preceding cut strip, the continuous strip is cut in a predetermined length, the position of the strip-laying head relative to the strip support is changed, the strip-laying head is moved for a backward stroke laying the continuous strip on the strip support so that the continuous strip overlaps the preceding cut strip, the cut strip is joined to the preceding cut strip, and those steps are repeated to overlap cut strips, the tire structural member can be manufactured by a small number of processes by efficient, simple machines.

Thus, a ply of a fixed length to be subjected to forming can be manufactured.

In the tire structural member manufacturing method according to the present invention, the continuous strip is fed continuously to a strip-laying head, the strip-laying head lays the continuous strip on a strip support as the same is moved transversely for a forward stroke over the strip support, the continuous strip is cut in a cut strip of a predetermined length when the strip-laying head reaches a position near the terminal of its forward stroke, the strip-laying head and the strip support are moved relative to each other to change the position of the strip-laying head, the strip-laying head is turned through an angle of 180°, the strip-laying head lays the continuous strip on the strip support so that the continuous strip is boned to the preceding cut strip as the same is moved transversely for a backward stroke over the strip support, and those steps are repeated to arrange cut strips on the strip support so that the cut strips overlap each other.

Since the strip-laying head lays the continuous strip on a strip support as the same is moved transversely for a forward stroke, the continuous strip is cut in a predetermined length, the position of the strip-laying head changed, the strip-laying head is turned through an angle of 180°, the strip-laying head lays the continuous strip on the strip support so that the continuous strip is boned to the preceding cut strip as the same is moved transversely for a backward stroke, and those steps are repeated to arrange cut strips so that the cut strips overlap each other, the tire structural member manufacturing method includes a small number of steps and can manufacture a tire structural member by using efficient, simple machines.

In the tire structural member manufacturing method according to the present invention, the continuous strip is fed continuously to a strip-laying head, a strip support is moved in a first direction while the strip-laying head lays the continuous strip on the strip support as the same is moved for a forward stroke over the strip support in a direction perpendicular to the first direction in which the strip support is moved, the continuous strip is cut in a cut strip of a predetermined length when the strip-laying head reaches a position near the terminal of its forward stroke, the strip-laying head and the strip support are moved relative to each other to change the position of the strip-laying head, the strip-laying head is turned through an angle of 180°, the strip support is moved in a second direction opposite to the first direction while the strip-laying head lays the continuous strip on the strip support as the same is moved for a backward stroke over the strip support in a direction perpendicular to the second direction in which the strip support is moved, and those steps are repeated to arrange cut strips on the strip support so that the cut strips overlap each other.

Since the strip-laying head lays the continuous strip on the strip support as the same is moved in the direction perpendicular to the first direction in which the strip support is moved, the continuous strip is extended obliquely on the strip support. Since the continuous strip is cut in a cut strip of a predetermined length, the position of the strip-laying head is changed, the strip-laying head is turned through an angle of 180°, and the strip-laying head lays the continuous strip on the strip support so that the continuous strip is boned to the preceding cut strip as the same is moved for the backward stroke in the direction perpendicular to the second direction in which the strip support is moved, the cut strips can be obliquely extended and overlap each other. Since the foregoing steps are repeated, the cut strips obliquely extended on the strip support can be successively arranged to form a tire structural member by a small number of steps by efficient, simple machines.

In the tire structural member manufacturing method according to the present invention, the continuous strip is fed continuously to a pressing means included in a strip-laying head, a strip support is moved in a first direction while the strip-laying head lays the continuous strip with its surface facing up on the strip support as the same is moved for a forward stroke over the strip support in a direction perpendicular to the first direction in which the strip support is moved, the continuous strip is cut in a cut strip of a predetermined length when the strip-laying head reaches a position near the terminal of its forward stroke, the strip-laying head and the strip support are moved relative to each other to change the position of the strip-laying head, the strip-laying head is turned through an angle of 180°, the strip support is moved in a second direction opposite to the first direction while the strip-laying head lays the continuous strip with its first surface facing up on the strip support as the same is moved for a backward stroke over the strip support in a direction perpendicular to the second direction in which the strip support is moved, those steps are repeated to arrange cut strips with their first surfaces facing up on the strip support so that the cut strips overlap each other, the pressing means of the strip-laying head is inverted, the continuous strip is supplied to the inverted pressing means of the strip-laying head, the strip support is moved in the first direction while the strip-laying head lays the continuous strip with its second facing up on the strip support as the same is moved for a forward stroke in the direction perpendicular to the first direction, the reversed continuous strip is cut in a cut reversed strip of a predetermined length when the strip-laying head reaches a position near the terminal of its forward stroke, the strip-laying head and the strip support are moved relative to each other to change the position of the strip-laying head, the strip-laying head is turned through an angle of 180°, the strip support is moved in the second direction opposite to the first direction while the strip-laying head lays the continuous strip with its second surface facing up on the strip support as the same is moved for a backward stroke in the direction perpendicular to the second direction, those steps are repeated to form a first tire structural member including the cut strips laid with their first surfaces facing up and successively arranged so as to overlap each other, and a second tire structural member including the cut strips laid with their second surfaces facing up and successively arranged so as to overlap each other.

The first tire structural member including the cut strips successively arranged so as to overlap each other and to incline in one direction can be formed by repeating the steps of moving the strip-laying head over the strip support for a forward stroke in a direction perpendicular to the first direction in which the strip support is moved, cutting the continuous strip in a cut strip of a predetermined length, changing the position of the strip-laying head, turning the strip-laying head through an angle of 180°, and moving the strip-laying head for a backward stroke in a direction perpendicular to the second direction opposite to the first direction while the strip-laying head lays the continuous strip on the strip support, and the second tire structural member including the reversed cut strips successively arranged so as to overlap each other and to incline in the other direction can be formed by repeating the same steps after inverting the pressing means of the strip-laying head.

In the tire structural member manufacturing method according to the present invention, the continuous strip is supplied continuously to a predetermined position on a strip-laying means; the continuous strip is cut in a cut strip of a predetermined length; the strip-laying means and a strip support are located relative to each other at close positions, respectively; the cut strip supported on the strip support is pressed against and attached to the strip support; and those steps are repeated to apply a necessary number of cut strips to the strip support such that the cut strips overlap each other with a side edge part of the succeeding cut strip overlying a side edge part of the preceding cut strip.

Work for applying the cut strip to the strip support can be efficiently achieved by applying the cut strip to the strip support by a single step, the cut strips can be surely applied to the strip support, and the cut strips can be prevented from peeling off the strip support, slackening and creasing.

According to a second aspect of the present invention, a tire structural member manufacturing system that joins a necessary number of cut strips successively to form a tire structural member comprises: a strip forming means for continuously forming a continuous strip of a width including the width of a joint lap, a continuous strip feed means for feeding a predetermined length of the continuous strip onto a conveyor transversely of the conveyor, a cutting means for cutting the continuous strip fed onto the conveyor in a cut strip of a predetermined length substantially equal to the section width of a tire, and a joining means for joining a side edge part of the succeeding cut strip laid on the conveyor to a side edge part of the preceding cut strip previously laid on and advanced by the conveyor.

A tire structural member of a width corresponding to the section width of a tire and a length corresponding to the circumference of a rim of a wheel for holding the tire thereon can be easily manufactured by continuously forming a continuous strip of a width including the width of a joint lap, feeding a predetermined length of the continuous strip onto a conveyor transversely of the conveyor, cutting the continuous strip fed onto the conveyor in a cut strip of a predetermined length substantially equal to the section width of a tire, joining a side edge part of the succeeding cut strip fed onto the conveyor to a side edge part of the preceding cut strip previously laid on and advanced by the conveyor, and repeating those steps.

In the tire structural member manufacturing system according to the present invention, the strip forming means forms the continuous strip in a width equal to the sum of an integral division of the circumference of a 1 in. diameter circle and the width of the joint lap to form an inner liner.

An inner liner of a width substantially equal to the section width of a tire and a length corresponding to the circumference of the rim of a wheel can be easily manufactured by forming a continuous strip of a width equal to the sum of an integral division of the circumference of a 1 in. diameter circle and the width of a joint lap, feeding the continuous strip by a predetermined length onto a conveyor transversely of the conveyor by the continuous strip feed means, cutting the continuous strip in a cut strip of a predetermined length substantially equal to the section width of a tire, overlapping a side edge part of the succeeding cut strip to a side edge of the preceding cut strip previously placed on and advanced by the conveyor, and repeating those steps by a number of times equal to the diameter of the rim expressed in inch.

Since the strip forming means produces the narrow continuous strip, the strip forming means is small, requires only a small floor space for installation, is capable of easily directly connected to a forming machine because its production ability matches that of the forming machine, and reduces the scale and cost of equipment.

In the tire structural member forming system according to the present invention, the strip forming means forms a continuous strip having a width of about 98.8 mm.

An inner liner of a desired length can be easily formed simply by successively arranging cut strips of a width on the order of 98.8 mm equal to the sum of the circumference of 79.8 mm of a 1 in. diameter circle and a width of 19 mm of a joint lap so as to overlap each other and joining the cut strips together.

The tire structural member manufacturing system according to the present invention may further comprise: a continuous strip feed means for feeding the continuous strip; a strip-laying head for laying the continuous strip fed thereto by the continuous strip feed means on a strip support while the same is being moved; a strip-laying head moving means for reciprocating the strip-laying head; a cutting means for cutting the continuous strip delivered by the strip-laying head as the strip-laying head is moved; a position changing means for moving the strip-laying head and the strip support relative to each other to change the position of the strip-laying head; and a control means for controlling the strip-laying head moving means, the cutting means and the position changing means so that the continuous strip laid by the moving strip-laying head is cut by the cutting means, and the cut strips are arranged successively on the strip support such that the cut strips overlap each other.

Thus a tire structural member can be efficiently manufactured by a small number of steps by simple machines by moving the strip-laying head in one direction for a forward stroke by the strip-laying head moving means to feed the continuous strip onto the strip support, cutting the continuous strip by the cutting means, and changing the position of the strip-laying head by the position changing means to arrange the cut strips successively so that the cut strips overlap each other.

The tire structural member manufacturing system according to the present invention may further comprise: a continuous strip feed means for feeding a continuous strip; a strip-laying head for laying the continuous strip fed thereto by the continuous strip feed means on a strip support while the same is being moved; a strip-laying head moving means for reciprocating the strip-laying head; a strip-laying head moving means for reciprocating the strip-laying head in directions perpendicular to those in which the strip support is moved, a cutting means for cutting the continuous strip delivered as the strip-laying head is moved, a position changing means for moving the strip-laying head and the strip support relative to each other to change the position of the strip-laying head, a strip-laying head turning means for turning the strip-laying head through an angle of 180°, and a control means for controlling the strip-laying head moving means, the cutting means, the position changing means, and the strip-laying head turning means so that the continuous strip laid by the moving strip-laying head is cut by the cutting means and the cut strips are arranged successively on the strip support such that the cut strips overlap each other.

The cutting means cuts the continuous strip, the position changing means changes the position of the strip-laying head and the strip-laying head turning means turns the strip-laying head through an angle of 180° every time the strip-laying head moving means moves the strip-laying head for the forward stroke to apply the continuous strip to the strip support to arrange the cut strips successively such that the cut strips overlap each other. Thus, a tire structural member can be efficiently manufactured by a small number of steps and simple machines.

The tire structural member manufacturing system according to the present invention may further comprise: a continuous strip feed means for feeding a continuous strip; a strip-laying head for laying the continuous strip fed thereto by the continuous strip feed means on a strip support while the same is being moved; a strip support moving means for moving the strip support forward and backward; a strip-laying head moving means for reciprocating the strip-laying head in directions perpendicular to directions in which the strip support is moved; a cutting means for cutting the continuous strip delivered as the strip-laying head is moved; a position changing means for moving the strip-laying head and the strip support relative to each other to change the position of the strip-laying head; a strip-laying head turning means for turning the strip-laying head through an angle of 180°; and a control means for controlling the strip-laying head moving means, the strip support moving means, the cutting means, the position changing means, and the strip-laying head turning means so that the continuous strip laid by the moving strip-laying head is cut by the cutting means and the cut strips are arranged successively on the strip support such that the cut strips overlap each other.

The strip-laying head is moved in a first direction for a forward stroke while the strip support is moved forward by the strip support moving means to feed the continuous strip onto the strip support so as to extend obliquely, the continuous strip is cut in a cut strip, the strip-laying head turned through an angle of 180° by the strip-laying head turning means is moved in a second direction for a backward stroke over the strip support being moved in the opposite direction to arrange the cut strips successively such that the cut strips overlap each other. Thus, a tire structural member can be efficiently manufactured by a small number of steps and simple machines.

BEST MODE FOR CARRYING OUT THE INVENTION

Figure 1:
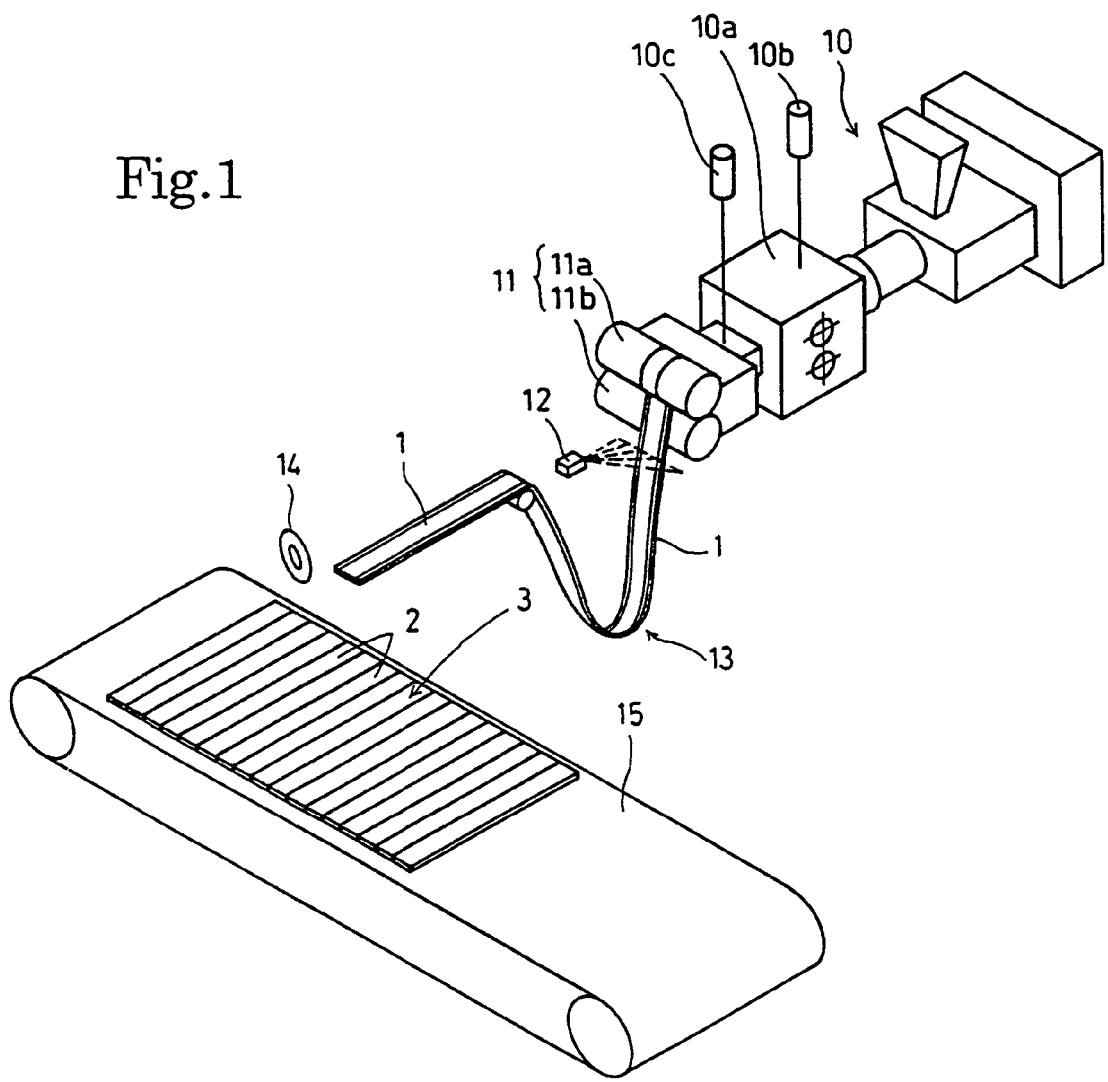
FIG. 1 is a schematic perspective view of an inner liner manufacturing system in a first embodiment according to the present invention.
Figure 2:
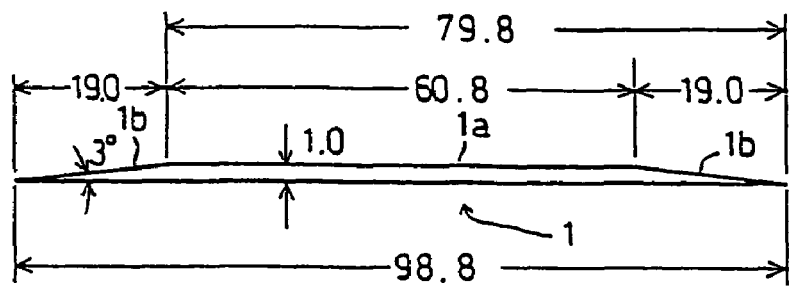
FIG. 2 is a cross-sectional view of a continuous strip.

An inner liner manufacturing system in a first embodiment according to the present invention will be described with reference to FIGS. 1 to 6. Referring to FIG. 1 showing the inner liner manufacturing system, an extruder 10 kneads a doughy rubber material supplied thereto and extrudes the doughy rubber material by a screw to feed the kneaded doughy rubber material to a roller head 11. The roller head 11 forms the doughy rubber material in a continuous strip 1 of 1.0 mm in thickness and 98.8 mm in width having a flat, trapezoidal cross section, and lays the continuous strip 1 continuously. The roller head 11 has an upper forming roller 11a, i.e., a profile roller provided with a circumferential groove corresponding to the continuous strip 1, and a lower forming roller 11b, i.e., a flat forming roller. As shown in FIG. 2, the continuous strip 1 has a flat middle part 1a, and opposite tapered side edge parts 1b. The middle part 1a has a width of 60.8 mm and a thickness of 1.0 mm. The tapered side edge parts 1b have a width of 19 mm, and have a sloping surface inclined at an inclination of about 3° to the back surface of the continuous strip 1. The width of 98.8 mm of the continuous strip 1 is the sum of the circumference p (=79.8 mm) of a 1 in. diameter circle and the width of 19 mm of a joint lap. If the inclination of the tapered side edge parts 1b is excessively large, the width of the joint lap is excessively small. Consequently, adjacent cut strips 2 provided by cutting the continuous strip 1 and arranged so as to overlap each other cannot be joined together by a uniform joint of a desired sheet gage. Thus, a suitable inclination of the tapered side edge parts 1b is on the order of 3° when the thickness of the cut strips 2 is 1.0 mm.

Figure 3:
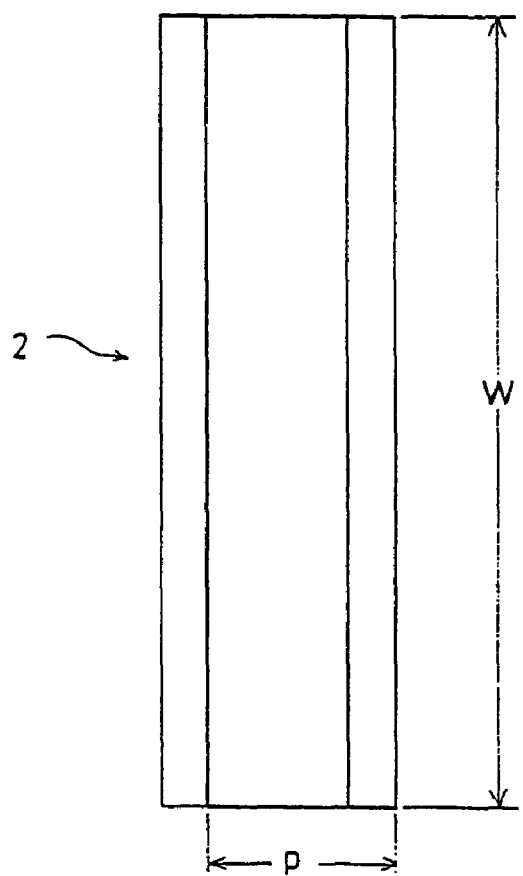
FIG. 3 is a plan view of a cut strip.
Figure 4:
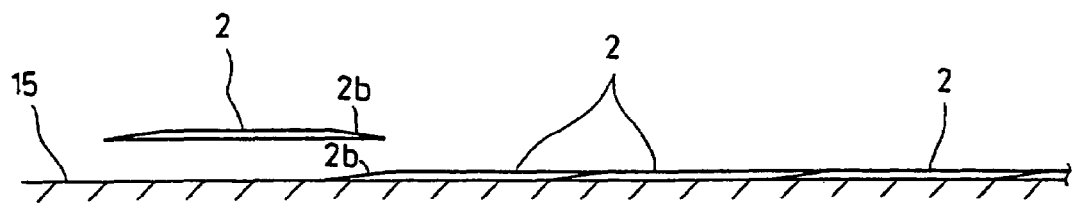
FIG. 4 is a sectional view of cut strips successively arranged on a conveyor belt so as to overlap each other.

The extruder 10 is provided with a fixed-displacement gear pump 10a to stabilize the width of the continuous strip 1. Pressure sensors 10b and 10c are disposed at the inlet and the outlet of the gear pump 10a, respectively. The operation of the gear pump 10a and the rotation of the screw are controlled so that pressure at the inlet of the gear pump 10a is kept constant. A width measuring device 12 measures the width of the continuous strip 1. The rotation of the rollers 11a and 11b of the roller head 11 is controlled in the basis of a signal provided by the width measuring device 12. The width of the continuous strip 1 is dependent on the draw ratio between the roller head 11 and the gear pump 10a. The continuous strip 1 forms a festoon 13 between the roller head 11 and a conveyor belt 15. The continuous strip 1 is fed transversely, i.e., in a direction perpendicular to the length of the conveyor belt 15, onto the conveyor belt 15. A cutter 14 cuts the continuous strip 1 in a cut strip 2 of a length W, which is equal to the section width Ws of a tire. As shown in FIG. 3, the cut strip 2 has a length W and a width of 98.8 mm. The cut strip 2 has a middle part 2a and opposite tapered side edge parts 2b. After the cut strip 2 has been laid at a predetermined position on the conveyor belt 15, the conveyor belt 15 is driven to advance the cut strip 2 by a distance of 79.8 mm (=98.8 mm−19 mm) equal to the circumference p of a 1 in. diameter circle. Subsequently, the continuous strip 1 is fed onto the conveyor belt 15, and is cut in a cut strip 2 of the length W. The succeeding cut strip 2 is laid on the conveyor belt 15 so that its 10.0 mm wide tapered side edge part 2b lies exactly on top of the 19.0 mm wide tapered side edge part 2b of the preceding cut strip 2. The superposed tapered side edge parts 2b are compressed and joined together. Thus, the successive cut strips 2 are securely joined together without forming joints of an increased thickness to form a sheet of a substantially uniform thickness as shown in FIG. 4. These steps of operation are repeated to arrange cut strips 2 successively and to join the adjacent cut strips together on the conveyor belt 15. A necessary number of cut strips 2 are arranged successively and joined together to form an inner liner 3.

Figure 5:
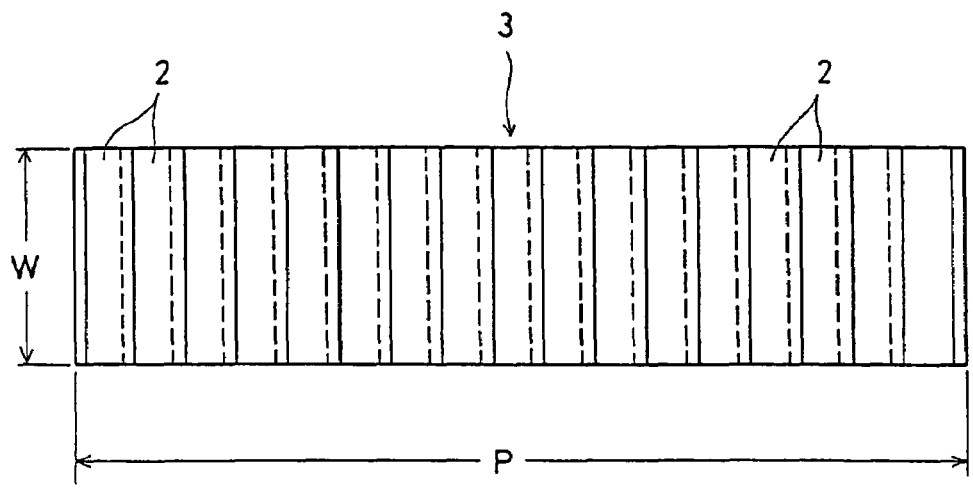
FIG. 5 is a plan view of an inner liner.

When the inner liner 3 is for a tire to be mounted on a wheel having rims of n inches in diameter, the inner liner 3 is formed by successively joining n cut strips 2. For example, when seventeen cut strips 2 are joined successively as shown in FIG. 5, an inner liner 3 having a width W equal to the section width Ws, and a length of 1375.6 mm equal to the sum of the effective length P=p×17 (=1356.6 mm) and the width of 19 mm of the tapered side edge part 2b is formed.

Figure 6:
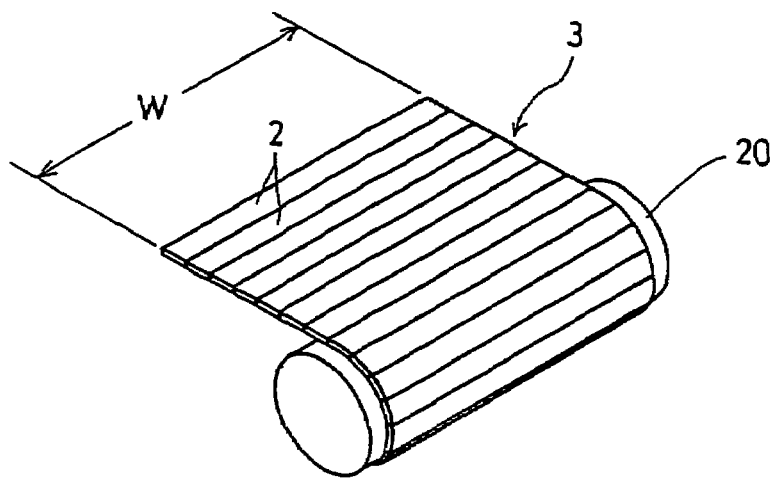
FIG. 6 is a perspective view of a forming drum, in which an inner liner is being wound around the forming drum.

Referring to FIG. 6, the inner liner 3 is wound around a forming drum 20, and the tapered side edge parts 2b of 19 mm in width of the opposite ends of the inner liner 3 are joined together to form the inner liner 3 in a cylindrical shape. The circumference of the cylindrical inner liner 3 is P=1356.6 mm equal to the circumference of a 17 in. diameter rim, i.e., 17π×25.4 mm.

Since the continuous strip 1 has a small width of 98.8 mm, the extruder 10 may be small and requires a small floor space for installation.

Thus, the cylindrical inner liner having a width W corresponding to the section width Ws and a length P equal to the circumference P of the rim and excluding the width of the joint lap, i.e., the tapered side edge part, can be efficiently formed by feeding the continuous strip 1 onto the belt conveyor 15, cutting the continuous strip 1 into a cut strip 2 of a length equal to the section width Ws, advancing the cut strip 2, feeding the continuous strip 1 onto the belt conveyor 15, cutting the continuous strip 1 into a cut strip 2 of a length equal to the section width Ws and laying the succeeding cut strip 2 so as to overlap the preceding cut strip 2, and repeating those steps to lay a necessary number of cut strips 2 successively on the conveyor belt and joining together the adjacent cut strips 2.

Thus, the inner liner manufacturing system is capable of easily directly connected to the forming machine because its production ability matches that of the forming machine, and reduces the scale and cost of equipment. Since the inner liner manufacturing system can be directly connected to the forming machine because the ability of the inner liner manufacturing system matches that of the forming machine, the extruder 10 is able to operate at an appropriate production rate for producing the continuous strip 1, so that troubles including the deterioration of the surface quality of the continuous strip 1 of rubber and the formation of holes in the continuous strip 1 can be avoided.

Figure 7:
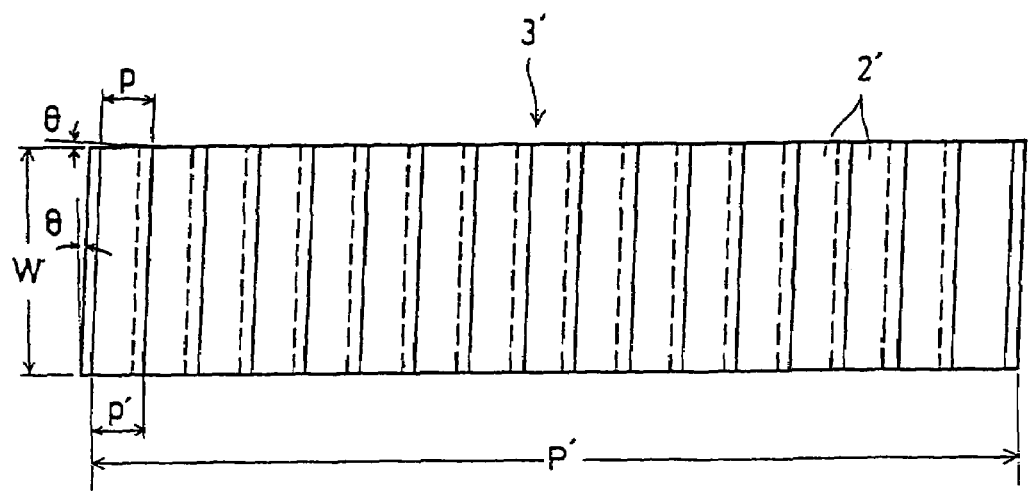
FIG. 7 is a plan view of another inner liner.

The effective length P of the inner liner 3 is an integral multiple of 79.8 mm. The effective length P of the inner liner 3 can be slightly adjusted by laying the continuous strip 1 slightly obliquely to the conveyor belt 15. When a length W of the continuous strip 1 is laid on the conveyor belt 15 in a direction at an angle θ to a line perpendicular to the conveying direction of the conveyor belt 15, and the continuous strip 1 is cut along a line parallel to the conveying direction of the conveyor belt 15, the effective width p', i.e., the width excluding that of the joint lap, of the cut strip 2' is equal to p/cos θ, which is slightly greater than the width p. The conveyor belt 15 is moved by a distance p', the continuous strip 1 is fed obliquely onto the conveyor belt 15 so that the joint lap of the continuous strip 1 overlies the joint lap of the preceding cut strip 1', the continuous strip 1 is cut along the line parallel to the conveying direction of the conveyor belt 15, and those steps are repeated to form an inner liner 3' as shown in FIG. 7. The circumference P' of the inner liner 3' as wound around the forming drum is equal to P/cos θ, which is slightly greater than the circumference P of the inner liner 3. Thus, the effective length of the inner liner can be easily adjusted by properly determining the angle θ to provide a practically proper inner liner. The foregoing inner liner manufacturing system in the first embodiment including the extruder 10, the roller head 11, the cutter 14 and the conveyor belt 15 can be used without modification and without requiring additional equipment for forming the inner liner having the effective length P'.

The extruder 10 forms the continuous strip 1 having a width of 98.8 mm, which is the sum of the circumference of 79.8 mm of a 1 in. diameter circle and the width of 19 mm of the joint lap. An inner liner of a desired length can be easily formed by successively arranging and joining cut strips obtained by cutting a continuous strip having a width equal to the sum of 39.9 mm, 26.6 mm, 19.95 mm or such, which is obtained by dividing 79.8 mm by an integer of 2, 3, 4 or such, and the width of 19 mm of a joint lap. Although a continuous strip of a smaller width can be produced by smaller equipment including an extruder, the small extruder needs to operate at an excessively high line speed, and the cycle time at which a cut strip joining process joins one cut strip to the preceding cut strip is excessively short. Thus, 98.8 mm is a proper width of the continuous strip. The width of 98.8 mm is a nominal width and is subject to change according to temperature and the actual width of the continuous strip includes an error necessarily.

The inner liner manufacturing system in this embodiment may employ a calender instead of the extruder 10 provided with the roller head 11.

A ply manufacturing system in a second embodiment according to the present invention will be described with reference to FIGS. 8 to 13. The ply manufacturing system is intended to carrying out a method of forming a carcass ply, i.e., a tire structural member.

Figure 8:
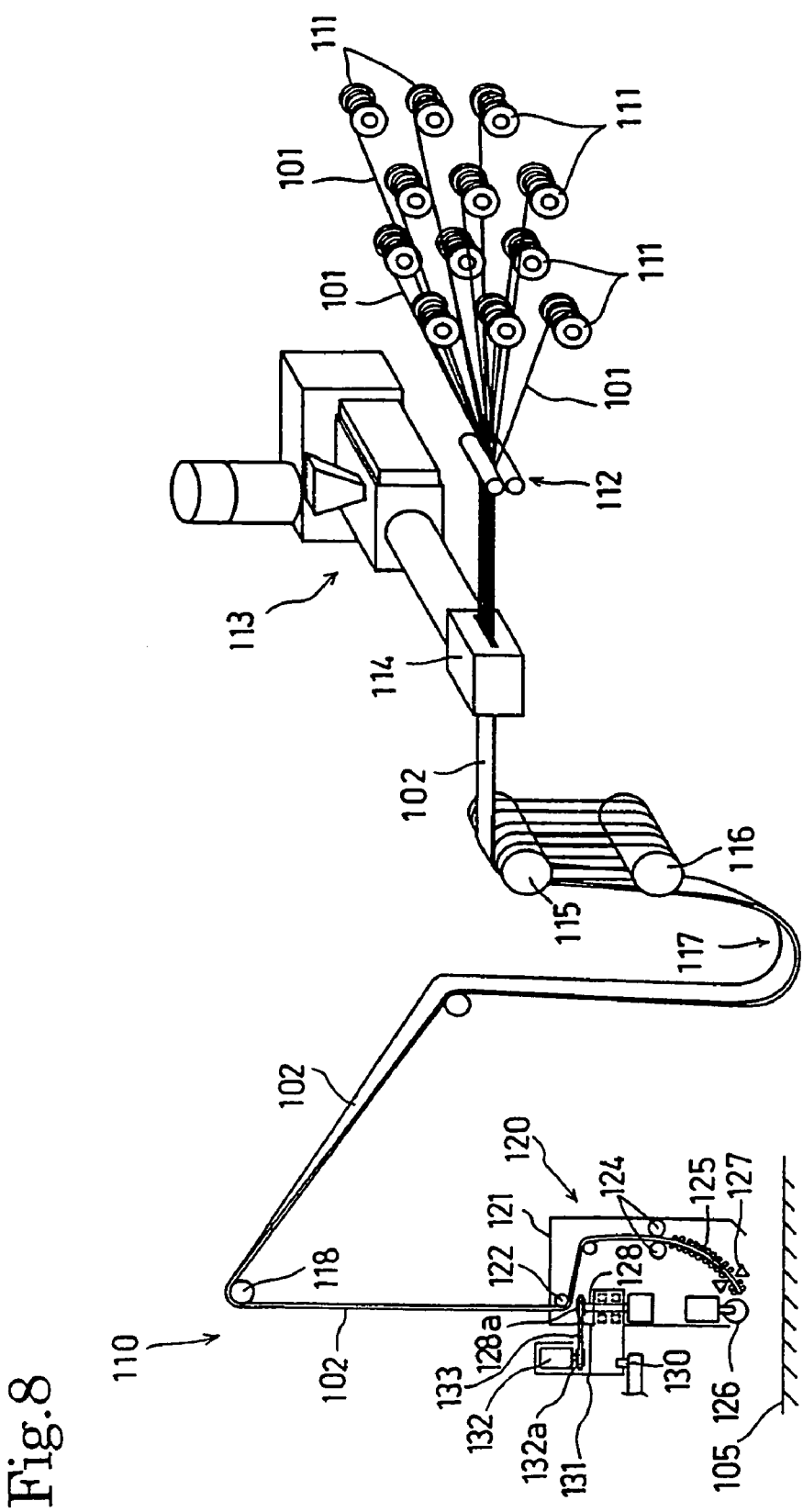
FIG. 8 is a schematic perspective view of a carcass ply manufacturing system in a second embodiment according to the present invention.

Referring to FIG. 8, the ply manufacturing system 110 carries out a step of coating dip cords 101 with rubber to form a continuous strip 102, and a step of laying the continuous strip 102 on a tire-forming drum 105, i.e., strip support, to form a carcass ply. A plurality of cord packages 111 formed by winding dip cords 101 on spools are supported on a creel. The dip cords 101 unwound from the packages 111 are gathered and arranged parallel to each other and are guided to an insulation head 114 included in an extruder 113 by a cord guide unit 112. The dip cords 101 are tensioned properly by exerting a force in the range of about 250 to about 300 g on each of the dip cords 101. The extruder 113 controls the head pressure of the insulation head 114 and coats the dip cords 101 with rubber to form a continuous strip 102 continuously. A passage for the rubber of the insulating head 114 is designed such that the thickness of an inner rubber layer, on the side of an inner tube with respect to the dip cords 101, of the continuous strip 102 is greater than that of an outer rubber layer, on the outer side with respect to the dip cords 101, of the same as shown in FIG. 9 to prevent the dip cords 101 from being exposed outside a vulcanized carcass play.

Figure 9:
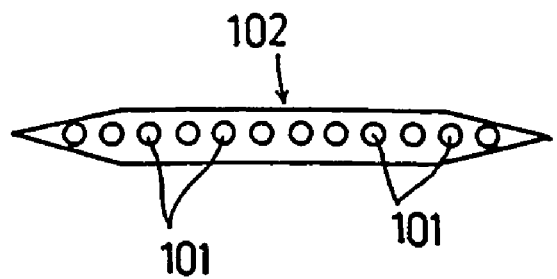
FIG. 9 is a cross-sectional view of a continuous strip.

As shown in a cross-sectional view in FIG. 9, the continuous strip 102 has a layer of the plurality of dip cords 101, and opposite tapered side edge parts. The continuous strip 102 having such a cross-sectional shape is pulled at a proper speed by a pull drum 115 and is cooled by a cooling drum 116. The continuous strip 102 forms a festoon 117 between the cooling drum 116 and a guide roller 118 disposed at an elevated position. The continuous strip 102 is supplied via the guide roller 118 to a strip-laying head 120 disposed below the guide roller 118.

The strip-laying head 120 has an inlet guide roller 122, an intermediate guide roller 123, feed rollers 124, guide rollers 125, a pressing roller 126, and a cutter 127. These members are housed in and supported on a case 121. The cutter 127 is disposed in the arrangement of the guide rollers 125. The continuous strip 102 is held between the feed rollers 124. The feed rollers 124 are driven for rotation through a predetermined angle by a driving device including a cylinder actuator and a rack-and-pinion mechanism to feed a predetermined length of the continuous strip 102. The feed rollers 124 are moved toward each other by another cylinder actuator to hold the continuous strip between them and are moved away from each other to release the continuous strip 102. The feed rollers 124 may be driven for rotation through a predetermined angle by a stepping motor or the like. The case 121 is supported pivotally on a carriage 131 that travels along a rail 130. The case 121 is fixedly held on a pivotal shaft 128 vertically extended through the carriage 131 and supported for turning. Thus, the strip-laying head 120 is able to turn on the pivotal shaft 128. A motor 132 is mounted on the carriage 131. A drive pulley 132a is fastened to the drive shaft of the motor 132, a driven pulley 128a is fastened to an upper end part of the pivotal shaft 128, and a belt 133 is extended between the drive pulley 132a and the driven pulley 128a. The motor 132 drives the pivotal shaft 128 through the belt 133 to turn the strip-laying head in an angular range of 180°. The carriage 131 is driven for travel together with the strip-laying head 120 along the rail 130 by a motor, not shown.

The inlet guide roller 122 is disposed virtually directly above the pivotal shaft 128. The continuous strip 102 supplied downward to the strip-laying head 120 is wound round the inlet guide roller 122 and the intermediate guide roller 123 disposed on one side of the inlet guide roller 122, passes between the feed rollers 124, and is guided along a curved guide path defined by the guide rollers 125 to a position under the pressing roller 126. The pressing roller 126 is disposed directly below the pivotal shaft 128. The continuous strip 102 is guided by the guide rollers 125 so as to extend horizontally under the pressing roller 126. The continuous strip 102 is cut by the cutter 127 disposed in the curved guide path defined by the guide rollers 125. The feed rollers 124 are driven for rotation to feed the continuous strip 102 to the pressing roller 126.

Figure 10:
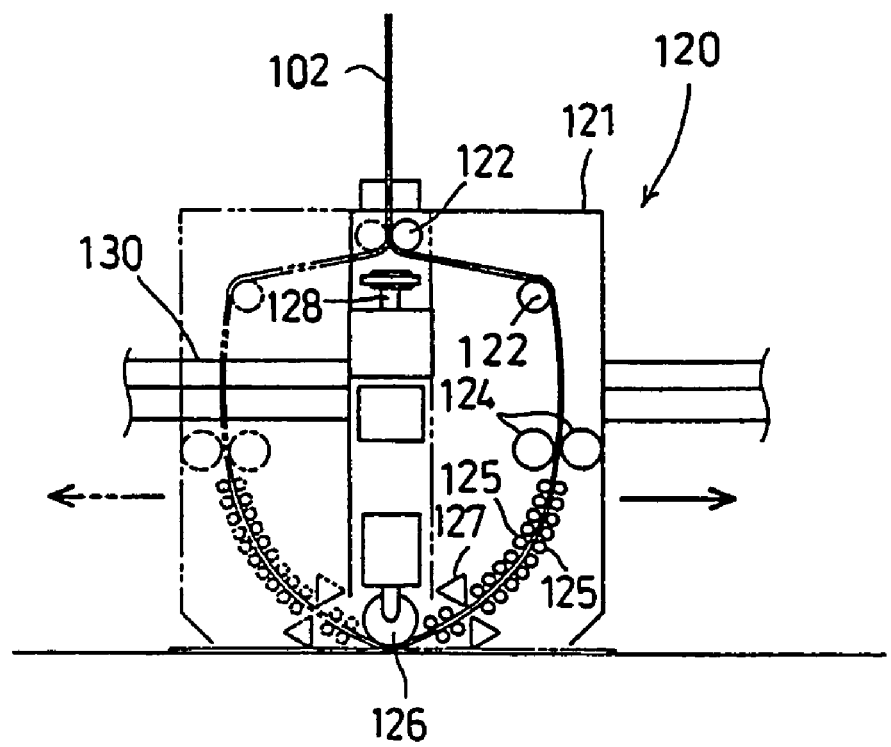
FIG. 10 is view of a strip-laying head.

When the strip-laying head 120 is set in a state indicated by continuous lines in FIG. 10 and is moved for a forward stroke in a first direction indicated by the arrow of continuous lines, the case 121 is turned to a first position such that the guide rollers 125 are on the right side, as viewed in FIG. 10, of the pressing roller 126 and the continuous strip 120 guided by the guide rollers 125 is delivered backward, i.e., to the left as viewed in FIG. 10. When the strip-laying head 120 is to be moved in the direction of the arrow indicated by broken lines, i.e., to the left, as viewed in FIG. 10, the case 121 is turned through an angle of 180° from the first position for the forward stroke to a second position for a backward stroke indicated by two-dash chain lines in FIG. 10 such that the guide rollers 125 are on the left side, as viewed in FIG. 10, of the pressing roller 126.

Figure 11:
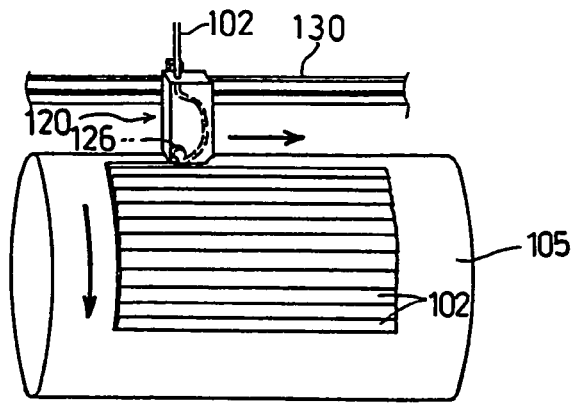
FIG. 11 is a perspective view showing a state where the strip-laying head is moved in a first direction for a forward stroke.
Figure 12:
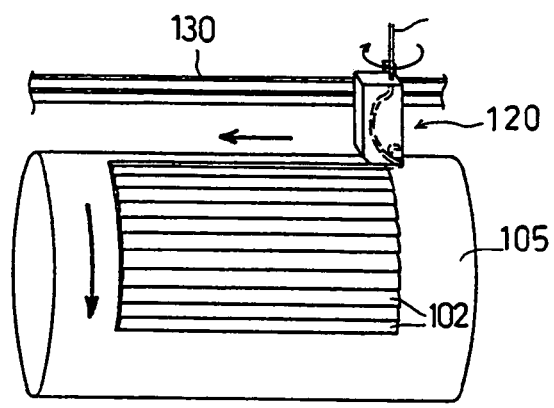
FIG. 12 is a perspective view showing a state where the strip-laying head is moved in a second direction for a backward stroke.

Steps of laying the continuous strip 102 on the tire-forming drum 105 by the strip-laying head 120 will be described with reference to FIGS. 11 and 12 showing some cut strips 102 laid on the tire-forming drum 105, and the strip-laying head 120 traveling along the rail 130 extended over the tire-forming drum 105 in parallel to the axis of the tire-forming drum 105.

Referring to FIG. 11, the strip-laying head 120 is moving in the first direction, to the right as viewed in FIG. 11, for the forward travel. The continuous strip 102 fed by the feed rollers 124 is guide by the guide rollers 125 toward the pressing roller 126. The pressing roller 126 presses the continuous strip 102 against the surface of the tire-forming drum 105 to attach the continuous strip 102 to the surface of the tire-forming drum 105. After the strip-laying head 120 has traveled a predetermined distance and has reached a position near the terminal of the forward stroke, the cutter 127 is actuated to cut the continuous strip 102, and the strip-laying head 120 is stopped after the trailing edge of the cut strip 102 has been pressed against the surface of the tire-forming drum 105 to terminate the forward stroke. Then, the motor 132 is actuated to turn the strip-laying head 120 on the pivotal shaft 128 through an angle of 180° to the second position, and the tire-forming drum 105 is turned through a predetermined angle. Since the pressing roller 126 pressing the trailing edge of the cut strip 102 lies directly below an axis about which the strip-laying head 120 turns, the leading edge of the continuous strip 102 can be easily positioned at the starting position of the backward stroke. Then, the strip-laying head 120 is moved in the second direction, to the left as viewed in FIG. 12, for the backward stroke. A side edge of the continuous strip 102 laid on the surface of the tire-forming drum 105 while the strip-laying head 120 is moving for the backward stroke overlies a side edge of the cut strip 102 laid previously on the tire-forming drum 105 while the strip-laying head 120 is moving for the forward stroke precedent to the backward stroke. The tire-forming drum 105 is turned through the predetermined angle necessary to change the position of the cut strip 102 laid on the tire-forming drum 105 relative to the strip-laying head 120 every time the movement of the strip-laying head 120 is changed from the forward stroke to the backward stroke or from the backward stroke to the forward stroke so that the side edge part of the succeeding cut strip 102 overlies that of the preceding cut strip 102.

After the strip-laying head 120 has traveled a predetermined distance and has reached a position near the terminal of the backward stroke, the cutter 127 is actuated to cut the continuous strip 102, and the strip-laying head 120 is stopped after the trailing edge of the cut strip 102 has been pressed against the surface of the tire-forming drum 105 to terminate the forward stroke. Subsequently, the strip-laying head 120 is turned through an angle of 180°, the tire-forming drum 105 is turned through the predetermined angle, and the strip-laying head 120 is started again for the forward stroke. The foregoing steps are repeated to arrange cut strips 102 successively on the entire circumference of the surface of the tire-forming drum 105 to form a carcass ply.

Figure 13:
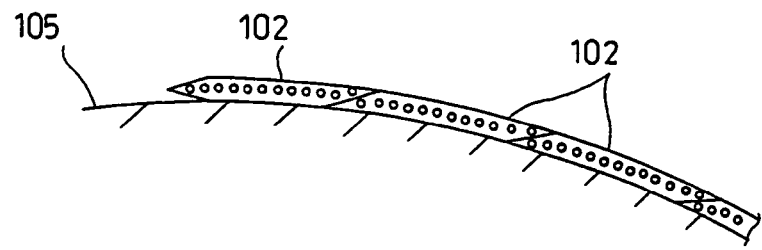
FIG. 13 is a view of assistance in explaining a strip-laying operation for successively laying cut strips on a tire-forming drum.

Since the side edge parts of the continuous strip 102 are tapered and the tapered side edge parts of the adjacent cut strips 102 overlap each other, the adjacent cut strip 102 can be surely joined together to form the carcass ply of a substantially uniform thickness as shown in FIG. 13 without forming joints of an increased thickness. When the side edge parts of the adjacent cut strips 102 are joined such that one cord 101 in the side edge part of one of the adjacent cut strips 102 and one cord 101 in the side edge part of the other cut strip 102 lie one on top of the other, the arrangement of the cords 101 can be corrected so that the cords 101 are arranged at proper pitches by moving the cords 101 when the carcass ply is expanded during a forming process to which the carcass ply is subjected later or during vulcanization.

Thus, the ply manufacturing system 110 forms the carcass ply efficiently by a small number of steps by reciprocating the strip-laying head 120 over the tire-forming drum 105 to arrange the cut strips 102 successively on the surface of the tire-forming drum 105.

The cut strips 102 may be successively arranged on a transfer drum, and the cut strips 102 may be transferred to a forming drum. In such a case, the transfer drum is slid, is pressed against the forming drum, and is driven for rotation in synchronism with the forming drum to transfer the cut strips successively arranged on the transfer drum from the transfer drum to the forming drum.

The strip-laying head 120 provided with the pressing roller 126 and the cutter 127 is simple in construction and is capable of efficiently achieving necessary work.

The ply manufacturing system 110 is capable of manufacturing a carcass ply by attaching cut strips 102 obtained by cutting the continuous strip 102 continuously produced by coating the dip cords 101 with rubber to the tire-forming drum 105, i.e., strip support. Therefore, any winding machine for winding the continuous strip 102 in rolls is not necessary, spaces for storing and transporting the rolls of the continuous strip 102 are not necessary, and hence the ply manufacturing system 110 needs a small floor space for installation.

A proper carcass play can be manufactured when the effective width of the continuous strip 102 is equal to the sum of an integral division of the circumference of the carcass play and an allowance in the range of 1 to 3 mm. The continuous strip 102 having the effective width substantially equal to the circumference of a 1 in. diameter circle can be used for forming carcass plies for all types of wheels respectively having rims of different diameters, which are expressed in inches.

The carcass ply manufacturing system 110 in the second embodiment is used in combination with the tire-forming drum 105. A plurality of carcass ply manufacturing systems may be used in combination with one tire-forming drum. The strip-laying heads 120 of the plurality of carcass ply manufacturing systems may be arranged at equal angular intervals around the tire-forming drum 105 to make the strip-laying heads 120 lay continuous strips simultaneously on the tire-forming drum 105 to manufacture carcass plies at a high productivity.

The strip-laying head 120 of the carcass ply manufacturing system 110 in the second embodiment needs to be turned through an angle of 180° when the traveling direction of the strip-laying head 120 is changed. A strip-laying head 150 included in a carcass ply manufacturing system in a third embodiment according to the present invention does not need to be turned.

Figure 14:
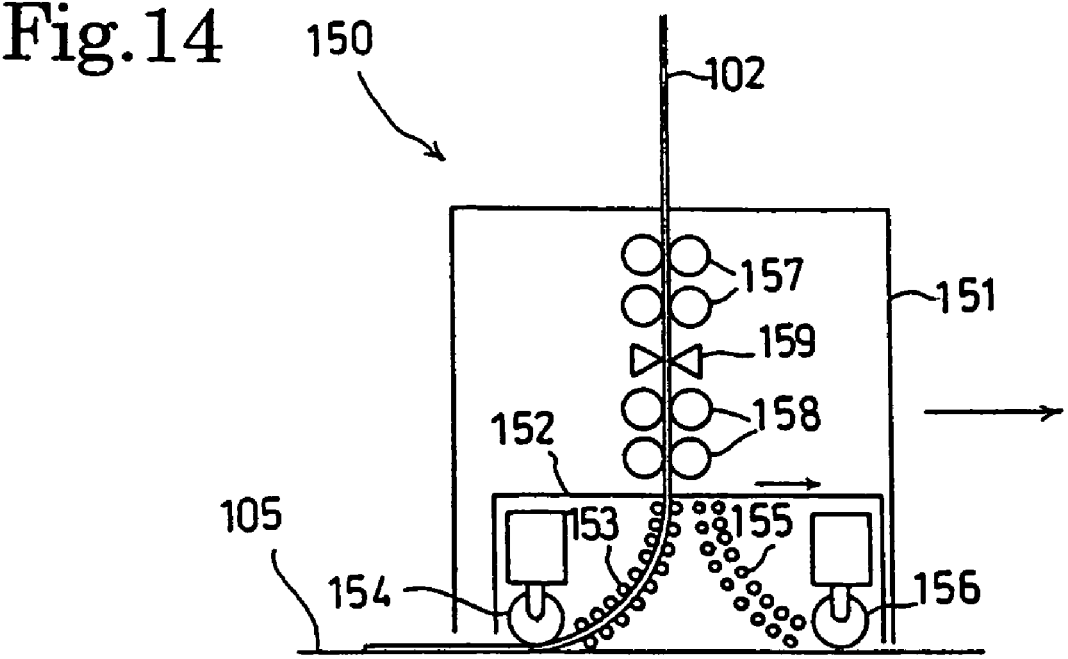
FIG. 14 is a schematic, cutaway side elevation of a strip-laying head according to the present invention.
Figure 15:
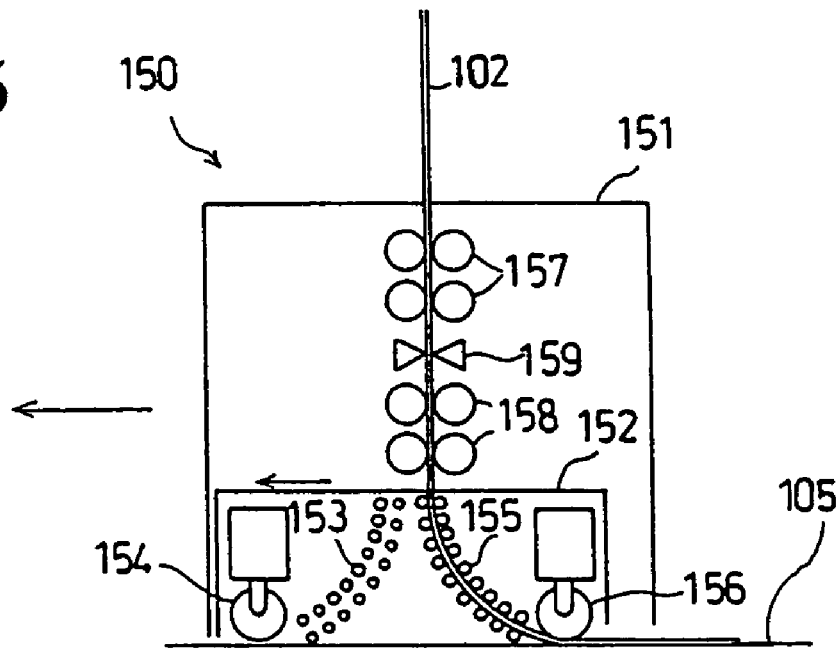
FIG. 15 is a schematic, cutaway side elevation of the strip-laying head shown in FIG. 14 in a state different from that shown in FIG. 14.

Referring to FIGS. 14 and 15, the strip-laying head 150 has a first guide path defined by guide rollers 153 and a second guide path defined by guide rollers 155, a first pressing roller 154 combined with the first guide path, a second pressing roller 156 combined with the second guide path, and an inner case 152 supporting and housing those components. The combination of the first guide path and the first pressing roller 154, and the combination of the second guide path and the second pressing roller 156 are symmetrical with respect to the vertical center line of the inner case. The inner case 152 is laterally movable. Pull rollers 157 and feed rollers 158 are arranged along a vertical line above the inner case 152, and a cutter 159 is disposed between the pull rollers 157 and the feed rollers 158.

When the inner case 152 is shifted to a first position, i.e., a right-hand position as viewed in FIG. 14, a continuous strip 102 fed from above to the strip-laying head 150 is pulled by the pull rollers 157, is fed to the first guide path of the guide rollers 153, is guided to the first pressing roller 154, and is laid on a tire-forming drum 105 as the strip-laying head 150 moves in a first direction, to the right as viewed in FIG. 14, for a forward stroke. After the strip-laying head 150 has reached a position near the terminal of the forward stroke, the cutter 159 is actuated to cut the continuous strip 102, the pull rollers 157 and the feed rollers 158 are stopped, and the strip-laying head 150 is moved further in the first direction to lay a cut strip 102 on the tire forming drum 105.

Upon the termination of the movement of the strip-laying head 150 for the forward stroke, the tire-forming drum 105 is turned in the predetermined direction through a predetermined angle, the inner case 152 is shifted to a second position, a left-hand position as viewed in FIG. 15, and operation for driving the pull rollers 157 and the feed rollers 158 is resumed. Then, the strip-laying head 150 is moved in a second direction, to the left as viewed in FIG. 15, for a backward stroke, the feed rollers 158 lay the continuous strip 102 to the second guide path of the guide rollers 155, is guided to the second pressing roller 156, and is laid on a tire-forming drum 105 as the strip-laying head 150 moves in the second direction for the backward stroke.

Thus, the strip-laying head 150 is moved alternately in opposite directions and the tire-forming drum 105 is turned through the predetermined angle every time the moving direction of the strip-laying head 150 is changed to form a carcass ply by successively arranging cut strips 102 so that the side edge parts thereof overlap each other. Thus, the inner case 152 is shifted, instead of turning the strip-laying head 150, every time the moving direction of the strip-laying head 150 is changed. The cut strips 102 laid by moving the strip-laying head 150 for the forward stroke and those laid by moving the strip-laying head 150 for the backward stroke are arranged with opposite sides facing up, respectively. However, the construction of the continuous strip 102 to be laid by the carcass ply manufacturing system in this embodiment is different from that of the continuous strip 102 shown in FIG. 9. In the continuous strip 102 used by the carcass ply manufacturing system in this embodiment, rubber layers respectively on the opposite sides of a layer of dip cords 101 have the same thickness, and hence the cut strip 102 may be laid on the tire-forming drum 105 with either one of the surfaces thereof or the other surface thereof facing up.

Thus, the carcass ply manufacturing system in the third embodiment including the strip-laying head 150, similarly to the carcass ply manufacturing system in the second embodiment including the strip-laying head 120, needs a small number of steps and is capable of efficiently forming carcass plies.

Although the carcass ply manufacturing system in the foregoing embodiments uses the tire-forming drum 105, i.e., a flat drum, a flat plate, a server, such as a conveyor, or a toroidal core drum may be used instead of the tire-forming drum. The position of the strip-laying head 150 relative to the tire-forming drum 105 may be changed by shifting the strip-laying head 150 relative to the tire-forming drum 150 instead of turning the tire-forming drum 150 relative to the strip-laying head 150. A continuous strip not reinforced with cords may be used instead of the continuous strip reinforced with the cords. Continuous strips reinforced with cords can be used for forming tire structural members other than the carcass plies, such as belts, while continuous strips not reinforced with cords can be used for forming inner liners, side walls and treads. The steel cords or resin cords may be used instead of the dip cords.

An inner liner can be formed simultaneously with a carcass ply so as to underlie the carcass ply to form a carcass ply reinforced with cords and lined with an inner liner by using a double-layer extruder. A continuous strip lined with an inner liner may be used.

When the cut strips are arranged successively on a toroidal core drum, the strip-laying head is moved from one curved end part of the toroidal core drum corresponding to one of the beads of a tire to the other curved end part of the toroidal core drum corresponding to the other bead of the tire along the contour of the toroidal core drum. In such a case, the pressure exerted by the pressing roller on parts of the cut strips corresponding to the opposite curved end parts of the toroidal core drum is increased to prevent end parts of the cut strips, which are liable to separate from each other, corresponding to the opposite curved end parts of the toroidal core drum from separating from each other.

Figure 16:
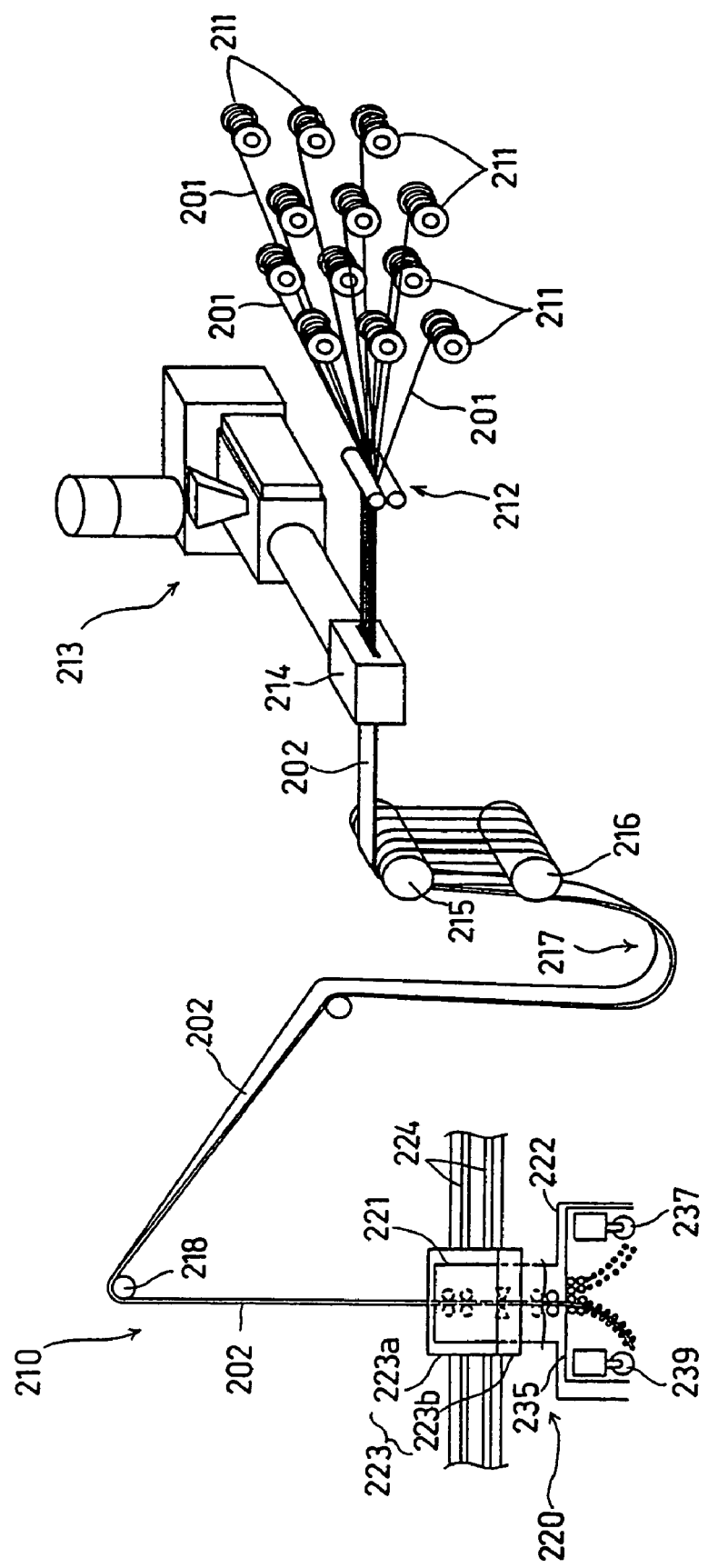
FIG. 16 is a schematic perspective view of a belt manufacturing system in a third embodiment according to the present invention.

A belt manufacturing system in a third embodiment according to the present invention for carrying out a belt manufacturing method according to the present invention will be described with reference to FIGS. 16 to 29. Referring to FIG. 16, the belt manufacturing system 210 in the third embodiment forms a continuous strip 202 by coating steel cords 201 with rubber, and forms a belt by successively arranging cut strips 202 on a conveyor belt 205.

A plurality of cord packages 211 formed by winding steel cords 201 on spools are supported on a creel. The steel cords 201 unwound from the packages 211 are gathered and arranged parallel to each other and are guided to an insulation head 214 included in an extruder 213 by a cord guide unit 212. The extruder 213 controls the head pressure of the insulation head 214 and coats the steel cords 201 with rubber to form a continuous strip 202 continuously. As shown in a cross-sectional view in FIG. 17, the continuous strip 202 has a layer of the plurality of steel cords 201, and opposite tapered side edge parts. Opposite side edge parts of the continuous strip 202 may be formed in a reduced thickness to form edges of about 2 mm in width. The continuous strip 202 having such a cross-sectional shape is pulled at a proper speed by a pull drum 215 and is cooled by a cooling drum 216. The continuous strip 202 forms a festoon 217 between the cooling drum 216 and a guide roller 218 disposed at an elevated position. The continuous strip 202 is supplied via the guide roller 218 to a strip-laying head 220 disposed below the guide roller 218.

Figure 18:
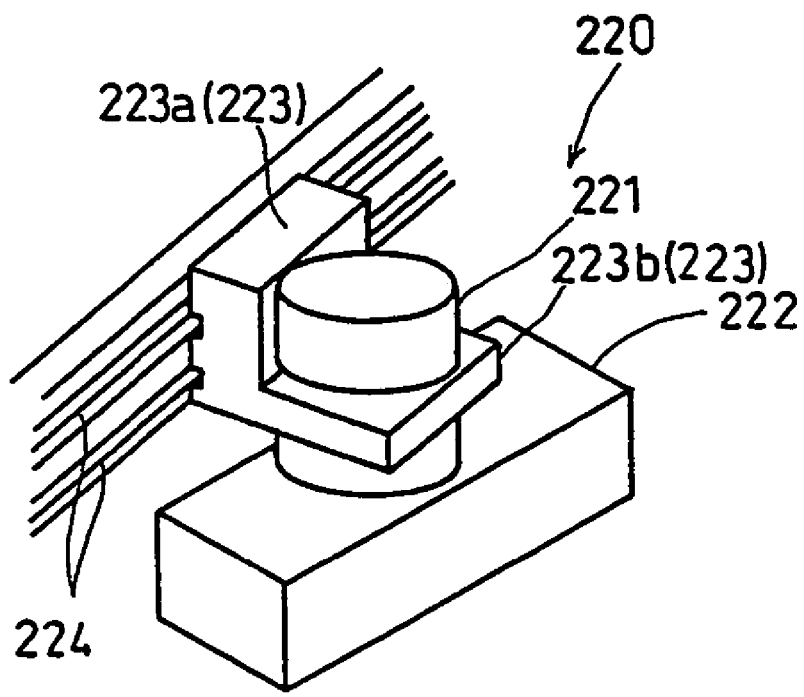
FIG. 18 is a perspective view of a strip-laying head.

Referring to FIG. 18, the strip-laying head 220 has a cylindrical upper case 221 and a lower case 222 having the shape of a rectangular solid and joined to the lower end of the cylindrical upper case 221 so as to extend transversely. The cylindrical upper case 221 is held on a carriage 223. The carriage 223 has a vertical base 233a, and a horizontal holding part 223b. The horizontal holding part 223b holds the cylindrical upper case 223a for turning. The carriage 223 is formed in an L-shape. The horizontal holding part 223b extends perpendicularly to the vertical base 223a. The vertical base 223a is engaged with two horizontal rails 224 for horizontal movement along the rails 224.

A head-turning motor, not shown, and a head-moving motor, not shown, are disposed in the vertical base 223a. The head-turning motor drives the cylindrical upper case 221, through a backlashless gear train or a timing belt, for turning together with the lower case 222 about the center axis of the cylindrical upper case 221. The head-moving motor drives the strip-laying head 220 for movement in opposite directions along the rails 224.

Figure 21:
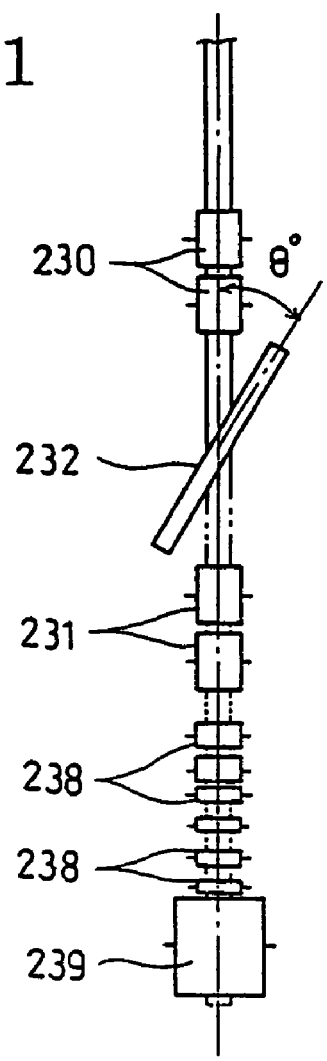
FIG. 21 is a sectional view taken on line XXI-XXI in FIG. 19.

Pull rollers 230 are disposed in an upper region in the cylindrical case 221 and delivery rollers 231 are disposed in a lower region in the cylindrical case 221 on a vertical axis. A cuter 232 is disposed between the pull rollers 230 and the delivery rollers 231. The cutter 232 is disposed so as to cut the continuous strip 202 along a cutting line inclined at an angle θ to the vertical axis as shown in FIG. 21. The angle of the cutting line to the vertical axis is changeable.

Figure 19:
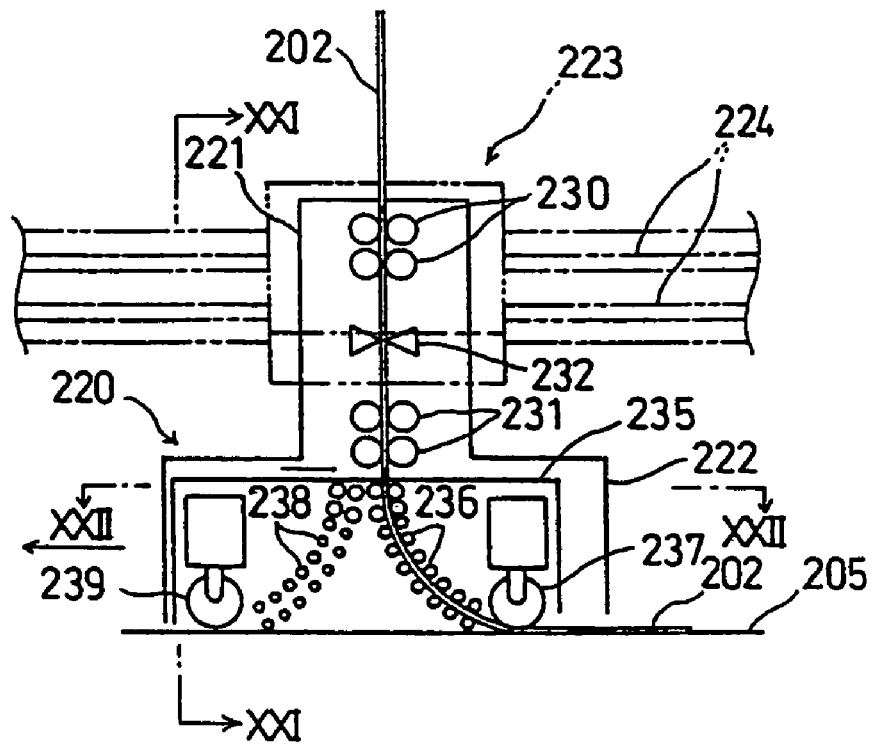
FIG. 19 is schematic, cutaway side elevation of the strip-laying head shown in FIG. 18.
Figure 20:
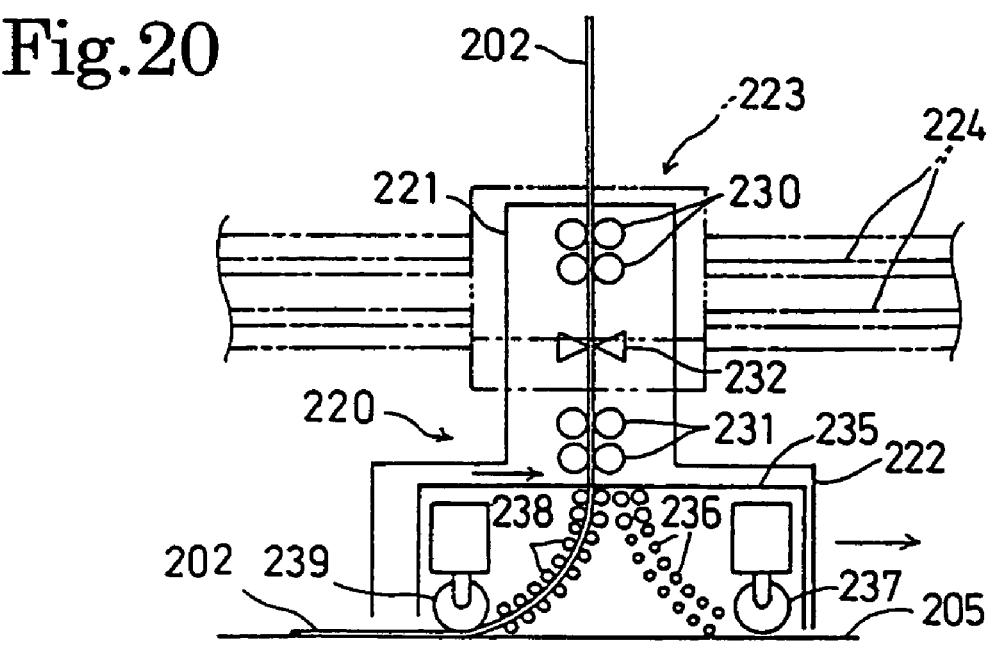
FIG. 20 is a schematic, cutaway side elevation of the strip-laying head shown in FIG. 18 in a state different from that shown in FIG. 19.

A first guide path defined by guide rollers 236, a second guide path defined by guide rollers 238, a first pressing roller 236 and a second pressing roller 239 are housed in and supported on an inner case 235 placed in the lower case 222. The combination of the first pressing roller 237 and the first guide path of the guide rollers 236, and the combination of the second pressing roller 239 and the second guide path of the guide rollers 238 are arranged symmetrically with respect to the vertical center line of the inner case 235. The inner case 235 is transversely movable. As shown in FIGS. 19 and 20, the first guide path of the guide rollers 236 and the second guide path of the guide rollers 238 are curved so as to extend gradually away from each other toward spaces under the pressing rollers 237 and 239, respectively.

Figure 22:
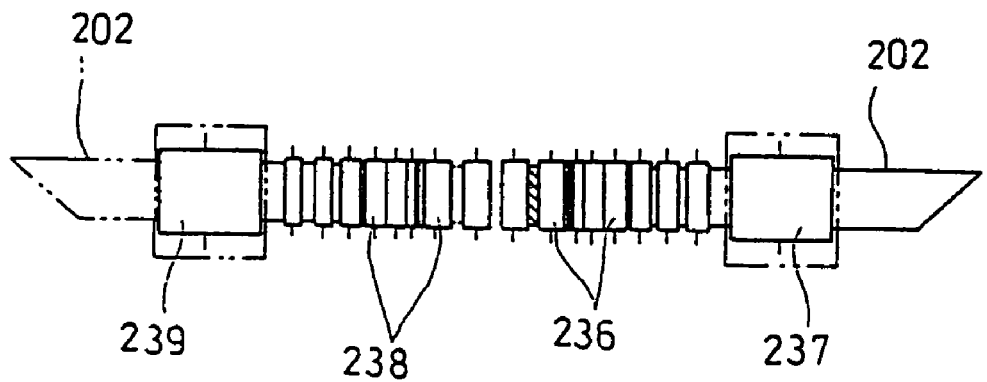
FIG. 22 is a sectional view taken on line XXII-XXII in FIG. 19.

An inner case shifting mechanism for transversely moving the inner case 235 is built in the lower case 222. When the inner case 235 is shifted to a first position, i.e., a left-hand position as viewed in FIG. 19, the continuous strip 202 fed from above to the strip-laying head 220 is pulled by the pull rollers 230, is delivered by the delivery rollers 231 to the first guide path of the guide rollers 236 on the right-hand side as viewed in FIG. 19, the continuous strip 202 is guided by the guide rollers 236 to the first pressing roller 237. A cut strip 202 having an obliquely cut end edge as shown in FIG. 22 is pressed against the conveyor belt 205, and is laid with its first surface facing up on the conveyor belt 205 as the strip-laying head 220 travels to the left. As shown in FIG. 22, the obliquely cut end edge of a cut strip 202 laid on the conveyor belt 205 with its first surface facing up and that of a cut strip 202 laid on the conveyor belt 205 with its second surface facing up are inclined in opposite directions with respect to the vertical line. There is not difference in surface quality between the first and the second surface of the cut strips 202.

Steps of laying the cut strips 202 on the conveyor belt 205 by the strip-laying head 220 will be described with reference to FIGS. 23 to 28. The conveyor belt 205 is supposed to be able to move forward and backward.

Only the guide rollers 236 and 238 and the pressing rollers 237 and 239 of the strip-laying head 220 are shown and the guide rail 224 for guiding the strip-laying head 220 for traveling is not shown in FIGS. 23 to 28. The guide rail 224 is extended perpendicularly to the conveying direction of the conveyor belt 205 to guide the strip-laying head 220 for reciprocation perpendicular to the conveying direction of the conveyor belt 205. The strip-laying head 220 is turned such that the guide rollers 236 and 238 guide the continuous strip 202 to lay the continuous strip 202 in a direction inclined at an inclination of 90°−θ. FIGS. 23 to 26 show a state where the continuous strip 202 is guided by the guide rollers 236 and is pressed by the pressing roller 237 against the conveyor belt 205 to lay the cut strip 202 with its first surface facing up on the conveyor belt 205.

Figure 23:
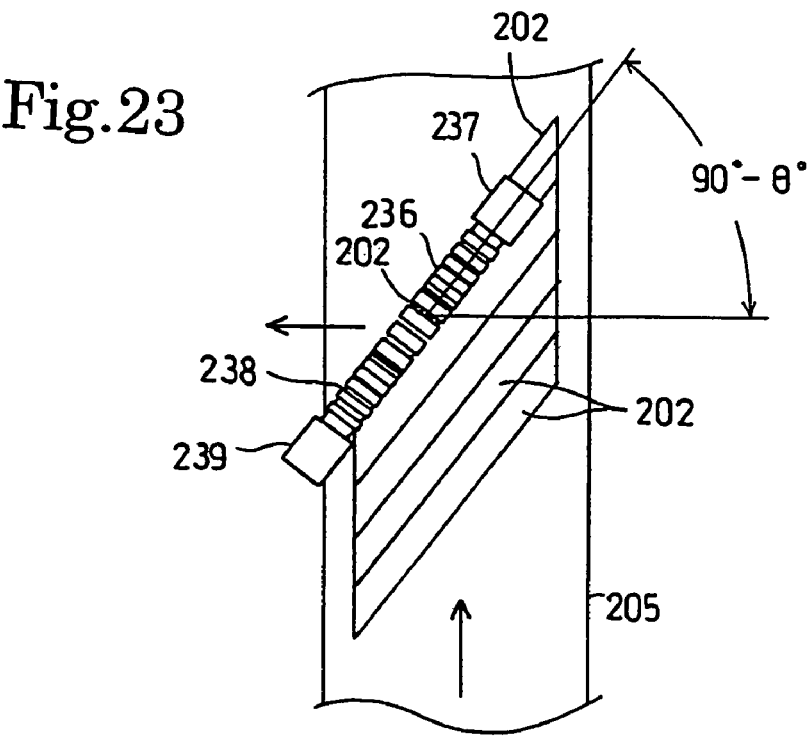
FIG. 23 is a plan view of assistance in explaining a strip-laying operation for laying cut strips on a conveyor belt by the strip-laying head such that first surfaces of the cut strips face up.

FIG. 23 shows some cut strips 202 laid on the conveyor belt 205 by a first strip-laying cycle. While the strip-laying head 220 moved to the left for a forward stroke, the conveyor belt 205 is moved backward in synchronism with the movement of the strip-laying head 220. The cut strips 202 are laid on the conveyor belt 205 so as to extend at the angle θ to the moving direction of the conveyor belt 205. The obliquely cut end edges of the cut strips 202 are aligned and the side edge parts of the adjacent cut strips 202 overlap each other. When the strip-laying head 220 reaches a position near the terminal of its forward stroke, the cutter 232 cuts the continuous strip 202 obliquely, the pull rollers 230 and the delivery rollers 231 are stopped, the trailing end of the cut strip 202 is laid on the conveyor belt 205 by the further movement of the strip-laying head 220 for the rest of the forward stroke, and then the forward stroke is terminated. Cut strips cut beforehand in a desired length may be laid on the conveyor belt 205.

Figure 24:
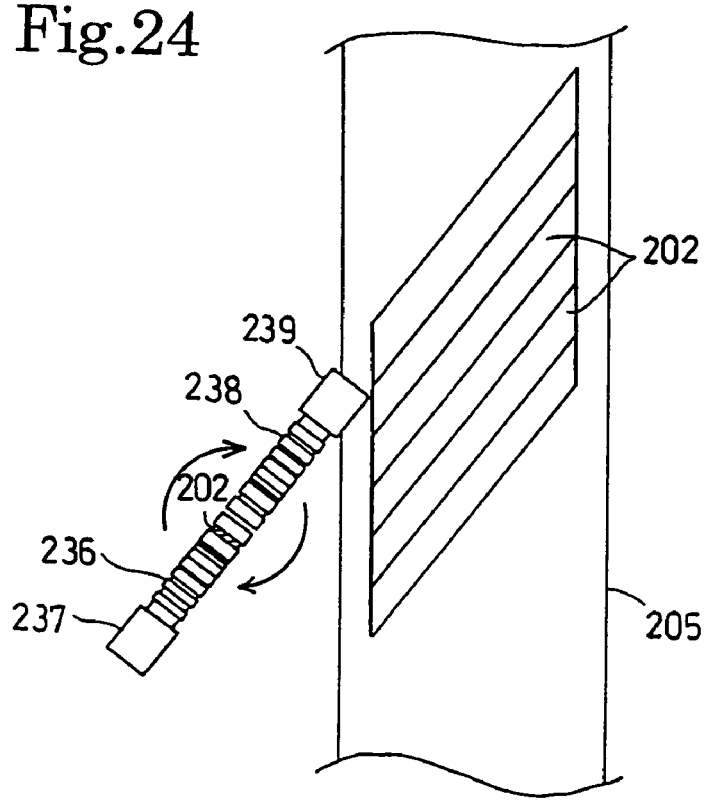
FIG. 24 is a plan view of the strip-laying head located on one side of the conveyor belt.
Figure 25:
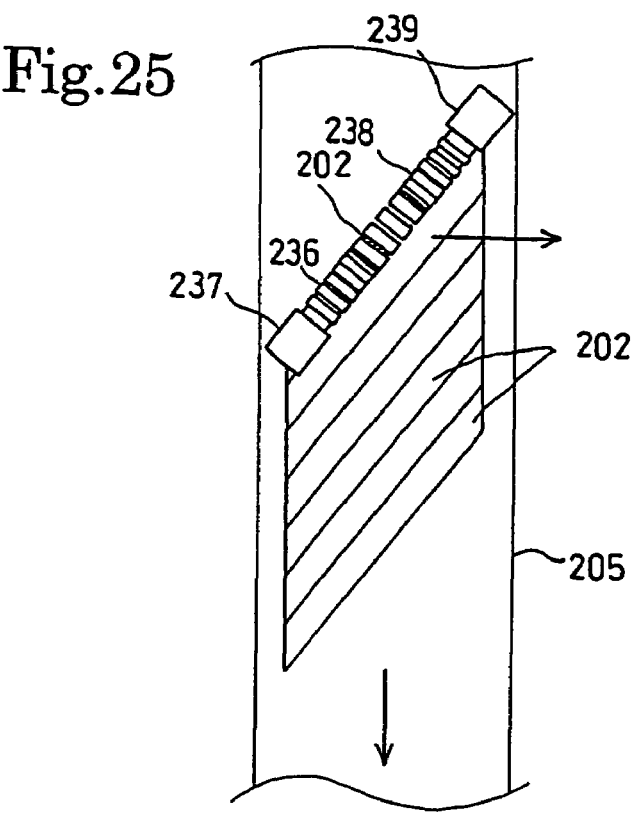
FIG. 25 is plan view of the strip-laying head in a state of laying the continuous strip on a side part of the conveyor belt.
Figure 26:
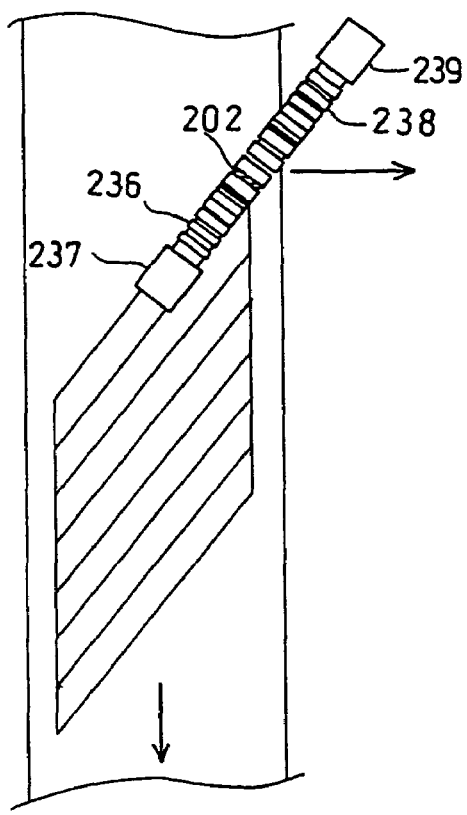
FIG. 26 is plan view of the strip laying head in a state of laying the continuous strip on a middle part of the conveyor belt.

The conveyor belt 205 is stopped and the strip-laying head 220 is turned through an angle of 180° as shown in FIG. 24. The conveyor belt 205 is advanced by a predetermined distance to locate a part, on which the next cut strip 202 is to be laid, of the conveyor belt 205 under the path of the strip-laying head 220. An obliquely cut edge of the continuous strip 202 is placed on the conveyor belt 205 so as to be aligned with the obliquely cut edges of the previously laid cut strips 202 as shown in FIG. 25. Then, the strip-laying head 220 is moved to the right for the backward stroke and the conveyor belt 205 is moved forward to lay the continuous strip 202 on the conveyor belt 205 by the pressing roller 237 at the inclination θ to the moving direction of the conveyor belt 205 so that a side edge part of the continuous strip 202 and that of the cut strip 202 previously laid on the conveyor belt 205 overlap each other. These steps are repeated to form a belt by laying the cut strips 202 for one tire on the conveyor belt 205 with their first surfaces facing up. After the belt thus formed has been conveyed to a proper position by the conveyor belt 205 to complete the first strip-laying cycle, the strip-laying head 220 is turned through an angle 2θ, and the inner case 235 is shifted to use the guide rollers 238 and the pressing roller 239 for a second strip-laying cycle.

Figure 27:
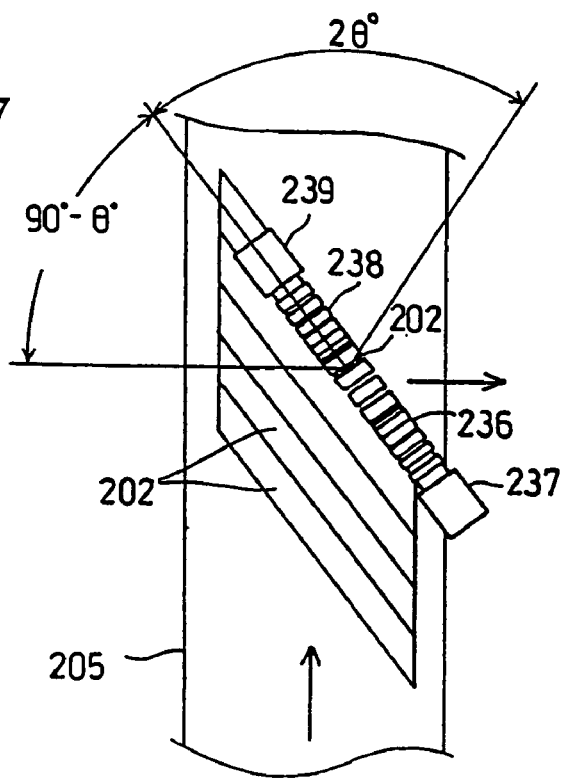
FIG. 27 is a plan view of assistance in explaining a strip-laying operation for laying cut strips on the conveyor belt by the strip-laying head such that second surfaces of the cut strips face up.

Then, as shown in FIG. 27, the strip-laying head 220 and the conveyor belt 305 are moved to lay the continuous strip 202 obliquely on the conveyor belt 205 with its second surface facing up by the pressing roller 239. Thus, the second strip-laying cycle lays cut strips 202 obliquely on the conveyor belt 205 at an angle 2θ to the direction in which the cut strips 202 were extended by the first strip-laying cycle. The cut strips 202 laid by the first strip-laying cycle and those laid by the second strip-laying cycle are symmetrical with respect to the conveying direction of the conveyor belt 205.

Figure 28:
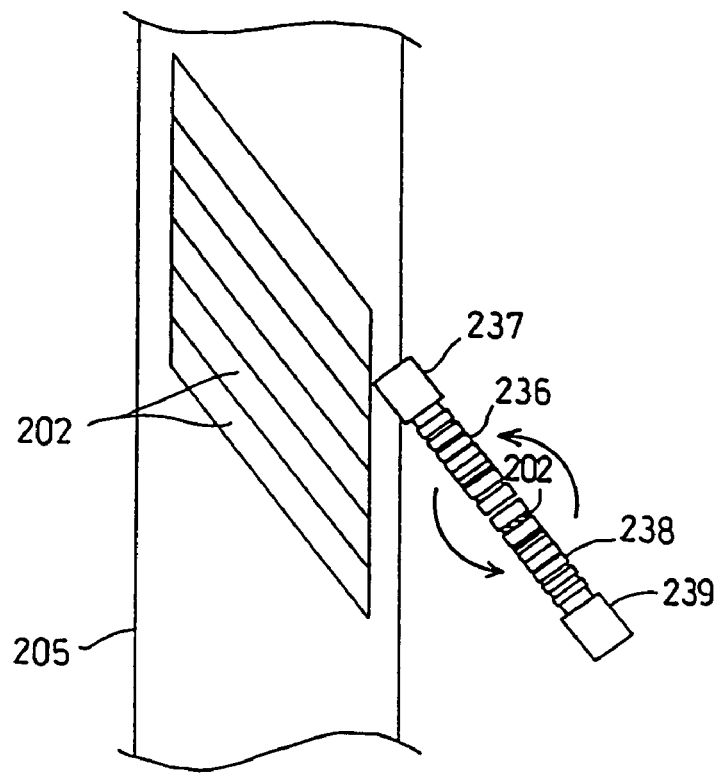
FIG. 28 is a plan view of the strip-laying head in a state where the same is being turned.

The strip-laying head 220 is turned through an angle of 180° as shown in FIG. 28 after the obliquely cut trailing end edge has been laid on the conveyor belt 205. The strip-laying head 220 does not need to be turned through the angle of 180° when the strip-laying head 220 is moved only in one direction for laying the cut strips 202. The conveyor belt 205 is advanced by a predetermined distance to locate a part, on which the next cut strip 202 is to be laid, of the conveyor belt 205 under the path of the strip-laying head 220. Then, the next cut strip 202 is laid on the conveyor belt 205 with its second surface facing up at the inclination θ to the moving direction of the conveyor belt 205 so that a side edge part of the cut strip 202 and that of the cut strip 202 previously laid on the conveyor belt 205 overlap each other. These steps are repeated to form a belt by laying the cut strips 202 for one tire on the conveyor belt 205 with their second surfaces facing up.

The respective extending directions of the cords of the belt formed by the first strip-laying cycle and those of the belt formed by the second strip-laying cycle are different. These belts including the cords extending in different directions, respectively, are superposed on a tire-forming drum. The second strip-laying cycle may superpose the cut strips 202 on those laid on the conveyor belt 205 by the first strip-laying cycle.

Figure 17:
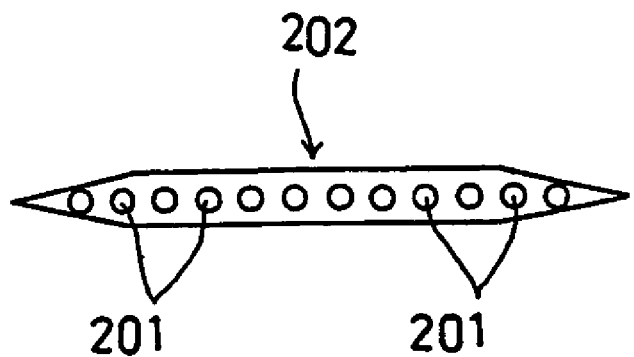
FIG. 17 is a cross sectional view of a continuous strip.
Figure 29:
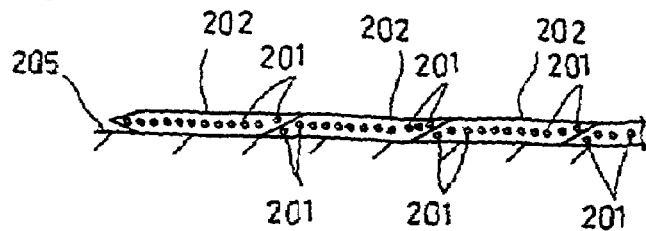
FIG. 29 is a cross-sectional view of cut strips successively laid on a conveyor belt.

Since the opposite side edge parts of the continuous strip 202 are tapered as shown in FIG. 17, and the tapered side edge parts of the adjacent cut strips 202 overlap each other, the adjacent cut strip 202 can be surely joined together to form the belt of a substantially uniform thickness as shown in FIG. 29 without forming joints of an increased thickness.

When the side edge parts of the adjacent cut strips 202 are joined such that one cord 201 in the side edge part of one of the adjacent cut strips 202 and one cord 201 in the side edge part of the other cut strip 202 lie one on top of the other, the arrangement of the cords 201 can be corrected so that the cords 201 are arranged at proper pitches by moving the cords 201 when the belt is expanded during a forming process to which the belt is subjected later or during vulcanization. If pitches between the cords are not important, the side edge parts of the adjacent cut strips 202 may be joined such that the cords therein do not lie one on top of the other. Opposite side edge parts of the continuous strip 202 may be formed in a reduced thickness, and the cut strips 202 may be laid so that such side edge parts of the reduced thickness are superposed.

The belt manufacturing system 210 in the third embodiment reciprocates the strip-laying head 220 while the conveyor belt 205 is moved in the conveying direction to lay the cut strips 202 successively on the conveyor belt 205. Thus, the belt manufacturing system 210 is capable of efficiently forming the belt efficiently by a small number of steps.

The strip-laying head 220 provided with the guide rollers 236 and 238 and the pressing rollers 237 and 239 is capable of forming two types of belts including cords sloping in reverse directions, respectively, at a low cost and has compact construction.

The strip-laying head 220 provided with the pressing rollers 237 and 239 and the cutter 232 is small and simple in construction and is capable of efficiently carrying out necessary work.

The belt manufacturing system 210 in the third embodiment is capable of continuously carrying out the process of manufacturing the continuous strip 202 by coating the steel cords 201 with rubber and the process of manufacturing the belt by successively laying the cut strips 202 obtained by cutting the continuous strip 202 on the conveyor belt 205. Therefore, any winding machine for winding the continuous strip 202 in rolls is not necessary, spaces for storing and transporting the rolls of the continuous strip 102 are not necessary, and hence the belt manufacturing system 210 needs a small floor space for installation.

A proper belt can be manufactured when the effective width of the continuous strip 202 is equal to the sum of an integral division of the circumference of the belt and an allowance in the range of 1 to 3 mm.

The belt manufacturing system 210 in the third embodiment is used in combination with the conveyor belt 205. A plurality of belt manufacturing systems may be used in combination with one conveyor belt to enhance production efficiency.

An iron plate, a flat drum or a toroidal forming drum may be used as a strip support instead of the conveyor belt. For example, a belt may be formed by laying cut strips on a belt forming drum, and belts may be superposed on a second drum by arranging cut strips on a shaped first case.

A belt may be formed so as to overlie a carcass ply formed by arranging cut strips one by one on a rubber inner liner applied to a toroidal core drum.

A continuous strip not reinforced with cords may be used instead of the continuous strip reinforced with the cords. Continuous strips reinforced with cords can be used for forming tire structural members other than the belt (two- or three-ply belt), such as carcasses (two-ply carcasses), while continuous strips not reinforced with cords can be used for forming inner liners, side walls and treads. The continuous strip reinforced with cords can be used for forming a two-ply structure, such as a structure including a belt ply and a rubber inner liner underlying the belt and a structure including a belt ply and a rubber cushion layer underlying the belt ply. Dip cords, steel cords, resin cords and such are possible cords for reinforcing the continuous strip.

The cut strips may be laid by a double-stroke laying method that lays cut strips both when the strip-laying head moves for the forward stroke and when the same moves for the backward stroke or by a single-stroke laying method that lays cut strips only when the strip-laying head moves for the forward stroke.

Cut strips of a desired length previously prepared by cutting a continuous strip may be fed to the strip-laying head instead of feeding a continuous strip to the strip-laying head and cutting the continuous strip by the strip-laying head.

Figure 30:
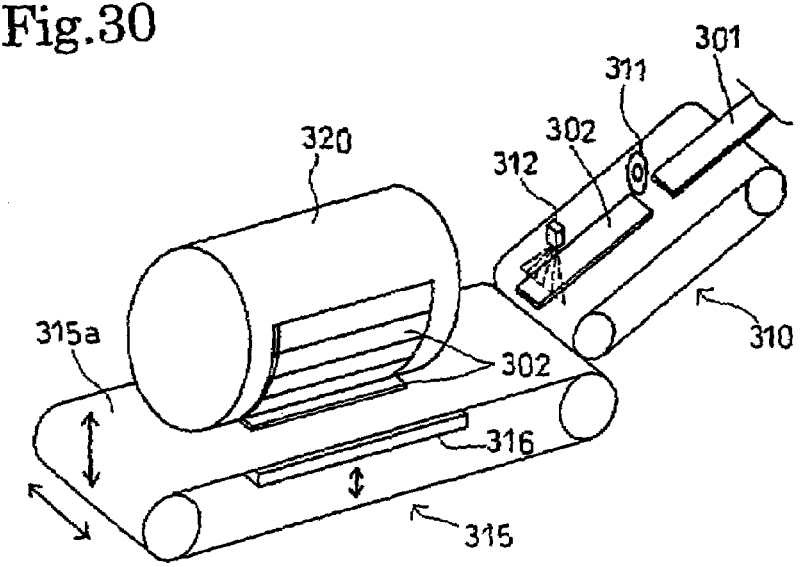
FIG. 30 is an inner liner manufacturing system in a fourth embodiment according to the present invention.
Figure 31:
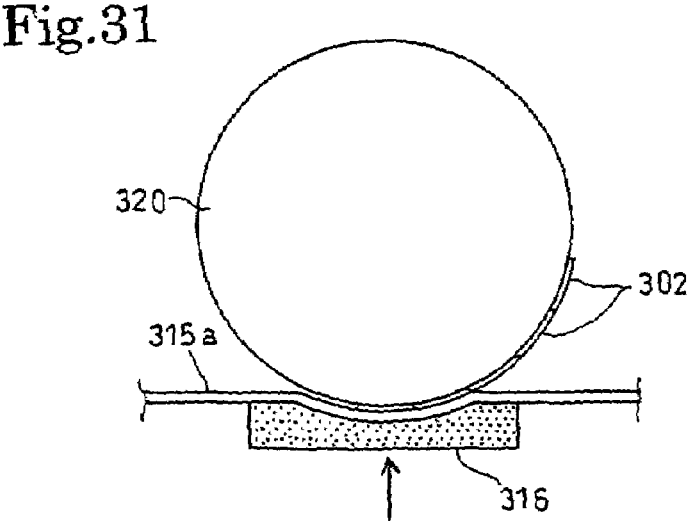
FIG. 31 is a sectional view of an essential part of the inner liner manufacturing system shown in FIG. 30.

An inner liner manufacturing system in a fourth embodiment according to the present invention will be described with reference to FIGS. 30 and 31. Referring to FIG. 30 showing the inner liner manufacturing system, a continuous strip 301 of 98.8 mm in width is supplied to a feed conveyor 310, the cutter 311 cuts the continuous strip 301 into cut strips 302 of a predetermined length corresponding to the section width of a tire. The feed conveyor 310 conveys the cut strips 302 to a support conveyor 315, i.e., a strip support means. A strip detector 312 detects the cut strip 302 before the cut strip 302 is transferred from the feed conveyor 310 to the support conveyor 315 to determine the position of the cut strip 302 with respect to a transverse direction. An elastic pressing plate 316 of rubber, such as sponge rubber, is disposed under the upper side of a conveyor belt 315a. The support conveyor 315 is transversely shiftable and vertically movable. The pressing plate 316 is vertically movable relative to the conveyor belt 315a. The support conveyor 315 is shifted laterally according to the lateral position of a cut strip 302 detected by the strip detector 312 for centering such that the cut strip 302 is fed to a central part of the conveyor belt 315a of the support conveyor 315. After the cut strip 302 has been transferred to the support conveyor 315, the support conveyor conveys the cut strip 302, returning to its original position directly below a forming drum 320 (or a transfer drum that transfers the cut strip to a forming drum).

The forming drum 320 is a vacuum drum capable of attracting the cut strip 302 to its outer surface. A cut strip having a rubber surface is able to adhere to the outside surface of a drum if the outside surface is mirror-finished. The forming drum 320 is disposed above the center of the conveyor belt 315a with its center axis extended in parallel to the conveying direction of the support conveyor 315. The cut strip 302 is located directly below the forming drum 320 by the support conveyor 315, and the support conveyor 315 is raised to bring the cut strip 302 into contact with a predetermined lower part of the forming drum 320 and, substantially at the same time, the pressing plate 316 is raised to press the cut strip 302 through the conveyor belt 315a against the forming drum 320 so that the cut strip 302 is applied to the forming drum 320 as shown in FIG. 31. The pressing plate 316 has a concavely curved upper surface conforming to the outside surface of the forming drum 320. Therefore, the pressing plate 316 is able to press the entire cut strip 302 substantially uniformly and elastically against the forming drum 320 to apply the cut strip 302 to the forming drum 320 with reliability.

The forming drum 320 is turned through a predetermined angle corresponding to a circumferential distance of 79.8 mm every time a cut strip 302 is attached thereto. Thus, cut strips 302 are arranged successively in a circumferential direction with a side edge part of the succeeding cut strip 302 overlying a side edge part of the preceding cut strip 302. Cut strips 302 are thus arranged successively so as to cover the outside surface of the forming drum 320 entirely to complete an inner liner. The inner liner manufacturing system thus forms an inner liner on the forming drum 320 and is simple and small in construction.

Thus, the cut strips 302 can be efficiently applied to the forming drum 320, can be prevented from falling off the forming drum 320 and can be surely applied to the forming drum 320 without creasing the same.

Figure 32:
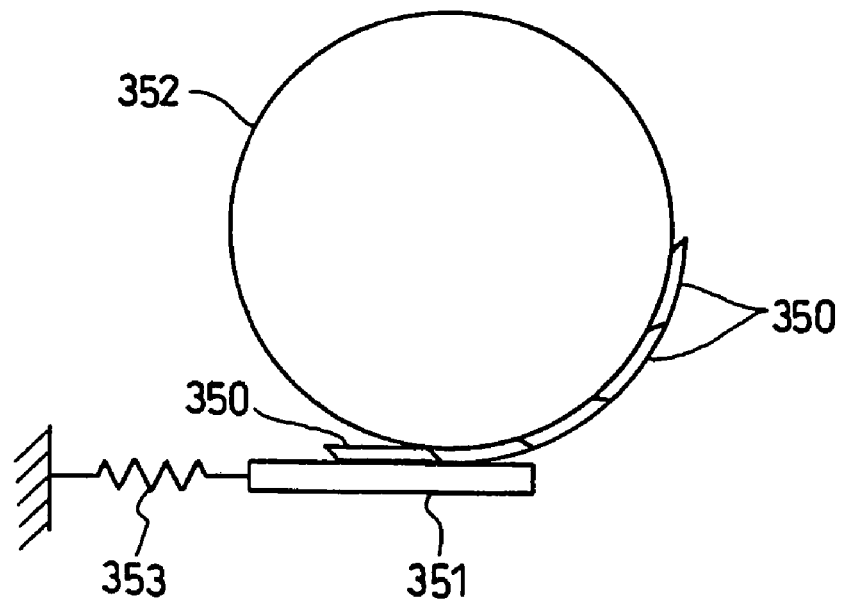
FIG. 32 is a sectional view of an essential part of a modification of the inner liner manufacturing system shown in FIG. 30.
Figure 32:
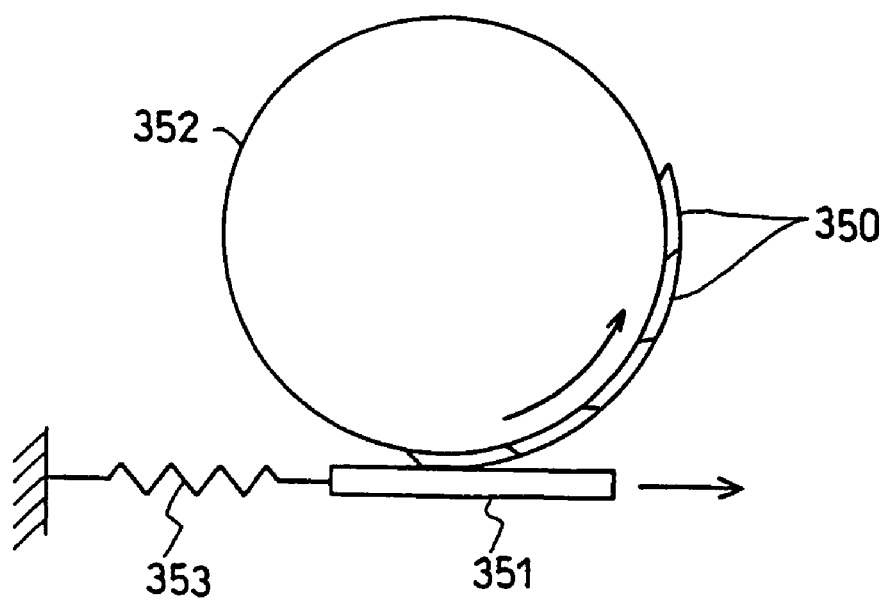

A movable flat plate may be used instead of the support conveyor 315 to apply the cut strips 302 to the forming drum. FIG. 32 shows such a movable flat plate 351. A cut strip 350 is delivered to a predetermined position on a flat plate 350, The flat plate 351 is pressed against a forming drum 352 to press the cut strip 350 against the forming drum 352 so that the cut strip 350 is transferred from the movable flat plate 351 to the forming drum 352. The movable flat plate 350 is supported so as to be slidable to the right and the left, as viewed in FIG. 32. A spring 352 has one end connected to the left end of the movable flat plate 351 and the other end connected to a fixed member. The forming drum 352 is moved relative to the flat plate 351 disposed at a position below the forming drum 352 toward the flat plate 351 to put a side edge part of a cut strip 350 previously applied to the forming drum 352 on a side edge part of a cut strip located on the flat plate 351 as shown in FIG. 32(1), and the superposed side edge parts are compressed between the forming drum 352 and the flat plate 351. Then, the forming drum 352 is turned counterclockwise as viewed in FIG. 32. Consequently, the cut strip 350 and the flat plate 351 are urged to move together horizontally to the right, as viewed in FIG. 32(2) against the resilience of the spring 353. Since the cut strip 350 is formed of rubber and hence friction coefficient between the cut strip 350 and the flat plate 351 is large, the cut strip 350 does not slip relative to the flat plate 351, the cut strip 350 and the flat plate 351 move together at a speed equal to the circumferential speed of the forming drum 352 and thereby the cut strip 350 can be accurately attracted to the forming drum 352. The flat plate 351 may be driven for horizontal movement by a motor or the like. In such a case, the flat plate 351 must be driven synchronously with the turning of the forming drum 352. The inner liner manufacturing system, which moves the cut strip 350 and the flat plate 351 frictionally by the turning forming drum 352, needs less component parts and is simpler in construction than the inner liner manufacturing system, which drives the flat plate for horizontal movement by a motor or the like for movement synchronous with the turning of the forming drum 352.

Figure 33:
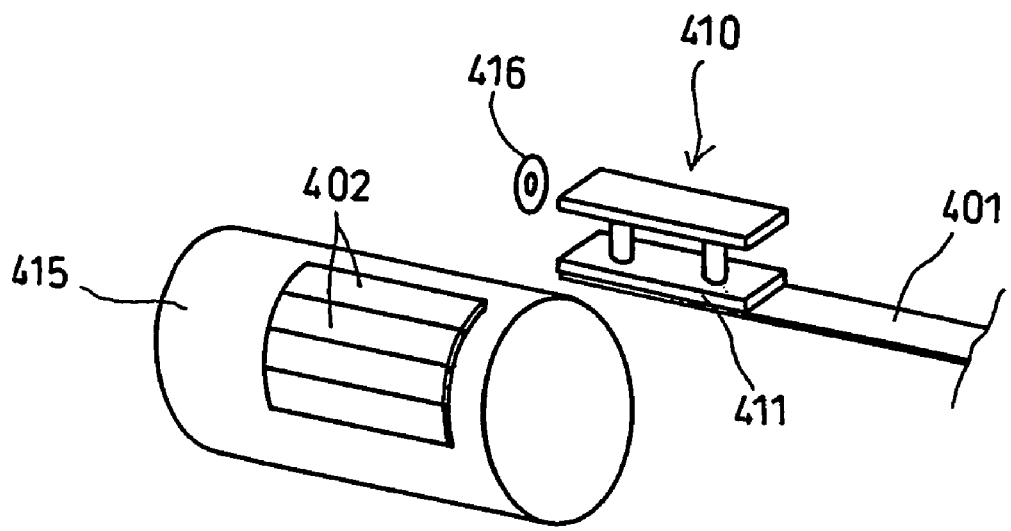
FIG. 33 is a schematic perspective view of an inner liner manufacturing system in a fifth embodiment according to the present invention.
Figure 34:
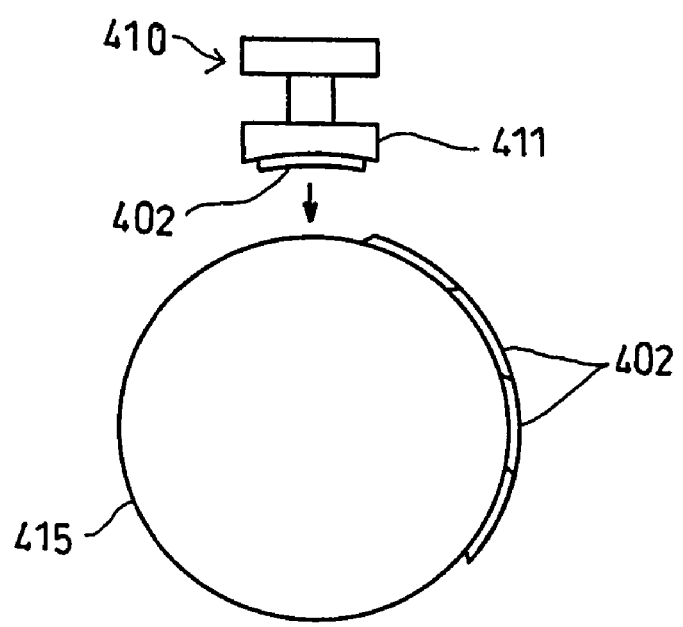
FIG. 34 is a sectional view of an essential part of the inner liner manufacturing system shown in FIG. 33.

An inner liner manufacturing system in a fifth embodiment according to the present invention will be described with reference to FIGS. 33 and 34. Referring to FIG. 33 showing the inner liner manufacturing system, a vacuum pad 411 having a size substantially equal to that of a cut strip 402 and included in a suction carrying device 410 attracts a leading end part of a continuous strip 401 of 98.8 mm in width by suction and carries the continuous strip 401 to locate the leading edge of the continuous strip 401 at a predetermined position above a forming drum 415. Then, a cutter 416 cuts a leading end part of the continuous strip 401 into a cut strip 402 of a predetermined length corresponding to the section width of a tire. The vacuum pad 411 holds the cut strip 402 by suction. As shown in FIG. 34, the vacuum pad 411 has a curved suction surface conforming to the outside surface of a forming drum 415, so that the cut strip 402 attracted by suction to the curved suction surface is curved along the curved suction surface. The suction carrying device 410 is lowered to press the cut strip 402 against a predetermined part of the outside surface of the forming drum 415. The forming drum 415 attracts the cut strip 402 by suction. The forming drum 415 is turned through a predetermined angle corresponding to a circumferential distance of 79.8 mm every time a cut strip 402 is attached thereto. Thus, cut strips 402 are arranged successively in a circumferential direction with a side edge part of the succeeding cut strip 402 overlying a side edge part of the preceding cut strip 402. Cut strips 402 are thus arranged successively so as to cover the outside surface of the forming drum 415 entirely to complete an inner liner. Thus, the cut strip 402 can be efficiently applied to the forming drum 415 by a single step, can be prevented from falling off the forming drum 415 and can be surely applied to the forming drum 415 without creasing the same.

If the continuous strip is reinforced with steel cords, a magnetic carrying device using magnetic force exerted by an electromagnet for attracting the continuous strip may be used instead of the suction carrying device using vacuum.

Figure 35:
FIG. 35 shows various strips of different shapes in sectional views.
Figure 35:
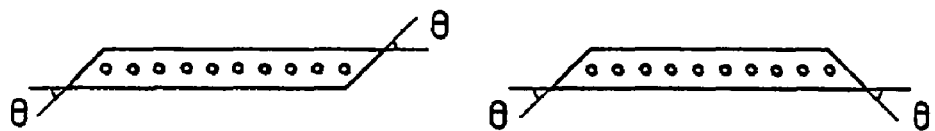
Figure 35:

Continuous strips having side edge parts, i.e., joint laps, of various shapes as shown in FIG. 35 may be used. A continuous strip shown in FIG. 35(1) has tapered joint laps having a small volume and a small step. A continuous strip shown in FIG. 35(2) has oblique joint laps inclined at an inclination θ, 1°<θ≦90°. Increase in the thickness of a joint is reduced when the inclination θ is small. FIG. 35(3) shows a continuous strip having stepped joint laps formed by reducing the thickness of side edge parts. When the joint laps are formed in a big width L, errors in the width can be easily absorbed.

Figure 36:
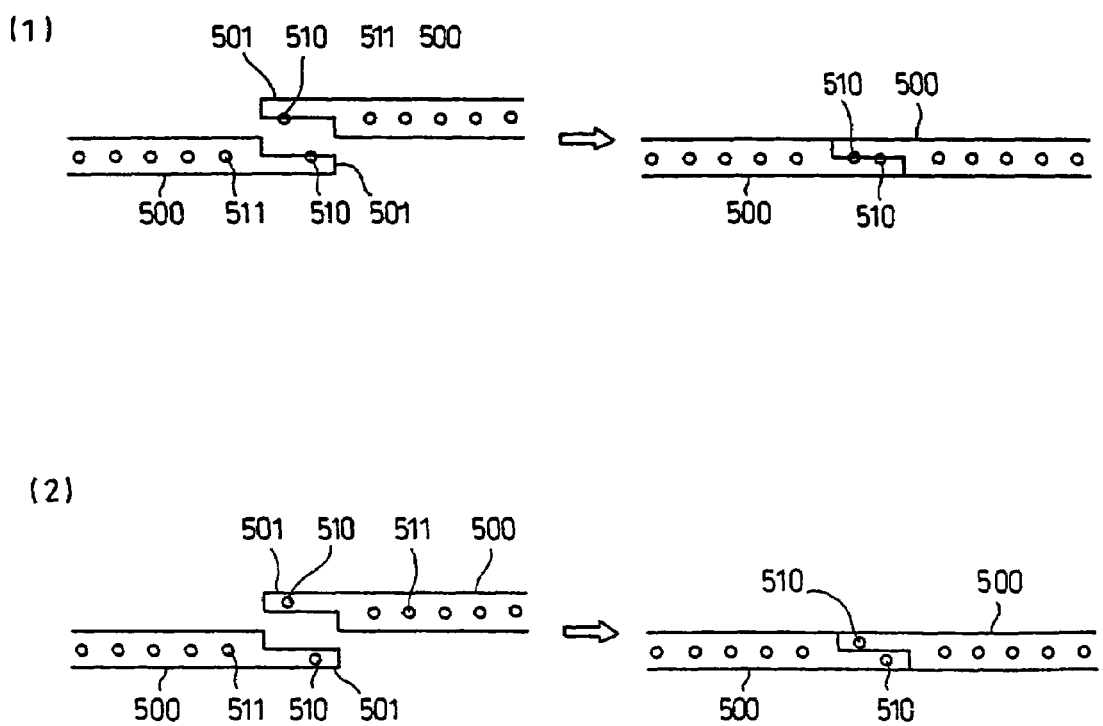
FIG. 36 shows cord strips to be joined together by a half-lap joint.
Figure 37:
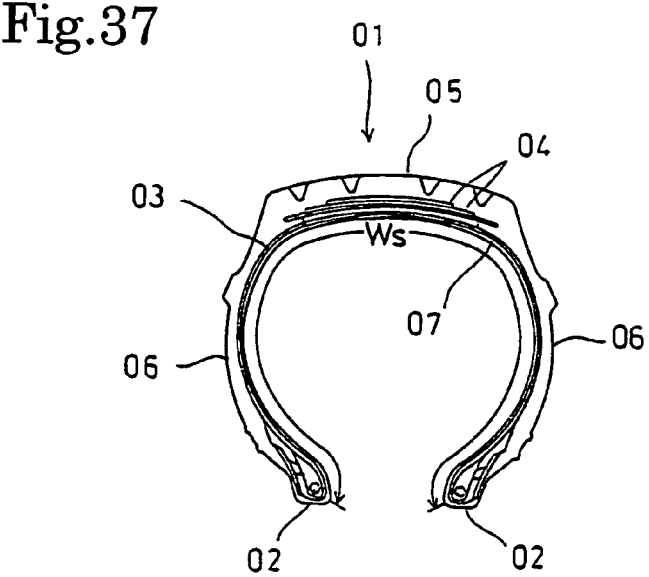
FIG. 37 is a sectional view of a tire.
Figure 38:
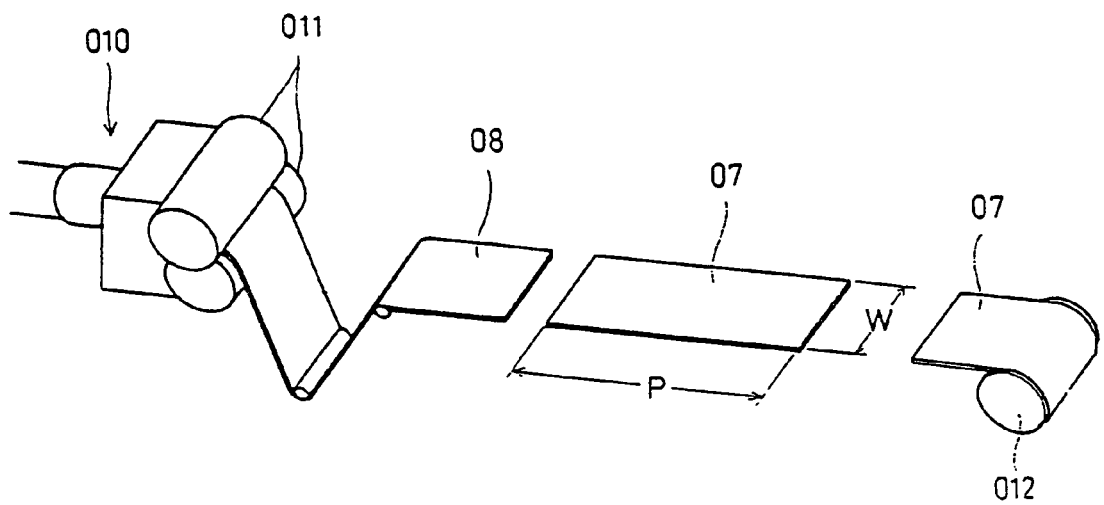
FIG. 38 is a schematic perspective view of a conventional inner liner manufacturing system.

In strips 500 of a half-lap joint type reinforced with cords as shown in FIG. 36, the outermost cord 510 in a joint lap 501 and nearest to a side edge is spaced an increased distance apart from the second outermost cord 511 such that, when the joint laps 501 of adjacent strips 500 are joined, the cord 510 in the joint lap 501 of one of the strips 500 lies between the cord 510 in the joint lap 501 of the other strip 500 and the second outermost cord 511 of the other strip 500 to avoid increasing the thickness of the lap joint formed by joining the joint laps

501 of the adjacent strips 500. About half part of the outermost cord 510 in the joint lap 501 of the strip 500 shown in FIG. 36(1) is exposed, while the outermost cord 510 in the joint lap 501 of the strip 500 shown in FIG. 36(2) is entirely embedded in the joint lap 501.

INDUSTRIAL APPLICABILITY

The present invention is applicable to the manufacture of tire structural members.

The invention claimed is:

1. A tire structural member manufacturing method comprising the steps of:
    cutting a continuous strip into successive cut strips of a length;
    supplying the cut strips one by one in a cut strip supplying direction onto a receiving surface of a strip support means;
    providing a rotatable drum positioned above and close to said receiving surface of the strip support means with a center axis of the drum disposed along in parallel with the cut strip supplying direction in which the cut strips are supplied onto the surface of the strip support means;
    individually applying a first one of the cut strips laid on the receiving surface of said strip support means onto an outer surface of the rotatable drum by pressing the first one of the cut strips between the drum and said strip support means;
    rotating said drum around said center axis thereof by a predetermined angle to press a second cut strip laid on the surface of the strip support means between said drum and said strip support means and to individually apply the second cut strip to the outer surface of the drum to join side edges of the first and second cut strips overlapped with each other on the drum;
    moving said strip support means at a speed equal to a circumferential speed of the rotating drum when the drum is rotated; and
    carrying out the above steps for a third and subsequent cut strips to produce a tire structural member.

2. The tire structural member manufacturing method according to claim 1, wherein said drum is a forming drum for forming a tire structural member.

3. The tire structural member manufacturing method according to claim 1, further comprising the steps of:
    detecting a lateral position of each of the cut strips on the conveyor with respect to a transverse direction perpendicular to said longitudinal cut strip supplying direction;
    moving the strip support means laterally according to the detected lateral position of each of the cut strips.

4. The tire structural member manufacturing method according to claim 1, wherein said rotatable drum is a transfer drum.

5. The tire structural member manufacturing method according to claim 1, wherein a flat plate is used as the strip support means.

6. The tire structural member manufacturing method according to claim 5, wherein said flat plate is moved against a spring resilience.

7. The tire structural member manufacturing method according to claim 5, wherein said flat plate is moved by a friction between itself and the cut strip on the drum.

8. The tire structural member manufacturing method according to claim 5, wherein said flat plate is moved by a motor.

9. The tire structural member manufacturing method according to claim 1, wherein said length of the cut strips is equal to a section length of a tire.

\* \* \* \* \*